(12) United States Patent  
Ma et al.

(10) Patent No.: US 11,790,711 B2
(45) Date of Patent: Oct. 17, 2023

(54) KEYS AND LOCKS

(71) Applicant: Yaowu Ma, Stevenson Ranch, CA (US)

(72) Inventors: Yaowu Ma, Stevenson Ranch, CA (US); Fen Ruan, Stevenson Ranch, CA (US); Jun Ma, Zhengzhou (CN); Pinzhen Huang, Zhengzhou (CN); Qianjing Ma, Zhengzhou (CN); Qianjia Ma, Zhengzhou (CN); George Ma, Zhengzhou (CN)

(73) Assignee: Yaowu Ma, Stevenson Ranch, CA (US)

( * ) Notice: Subject to any disclaimer, the term of this patent is extended or adjusted under 35 U.S.C. 154(b) by 37 days.

(21) Appl. No.: 17/352,623

(22) Filed: Jun. 21, 2021

(65) Prior Publication Data

US 2021/0312735 A1 Oct. 7, 2021

Related U.S. Application Data

(63) Continuation of application No. 16/734,401, filed on Jan. 5, 2020, now Pat. No. 11,055,938, which is a
(Continued)

(51) Int. Cl.
*E05B 47/00* (2006.01)
*G07C 9/00* (2020.01)
(Continued)

(52) U.S. Cl.
CPC ........ *G07C 9/00563* (2013.01); *B60R 25/209* (2013.01); *B60R 25/23* (2013.01);
(Continued)

(58) Field of Classification Search
CPC ........... G07C 2009/00325; G07C 2009/00634; G07C 2009/00793; G07C 2209/62; G07C 9/00174; G07C 9/00563; G07C 9/0069; G07C 9/23; G07C 9/00309; G07C 2009/00404; G07C 2009/00412; G07C 2009/00507; G07C 2009/00547; G07C 2009/00769; G07C 2009/00825; G07C 2009/00865; G07C 2209/04; G07C 2209/63; G07C 9/00571; G07C 9/00944;
(Continued)

(56) References Cited

U.S. PATENT DOCUMENTS 10,538,220 B1 * 1/2020 Tyagi ............... B60R 25/245
2010/0102927 A1 * 4/2010 Monig ............... E05B 19/04
340/5.64
(Continued)

*Primary Examiner* — Dionne Pendleton
(74) *Attorney, Agent, or Firm* — SYNCODA LLC; Feng Ma

(57) ABSTRACT

A key and lock set for a vehicle includes: a vehicle lock set with both vehicle door lock and vehicle engine start lock; a passcode for mechanical lock; a rotary mechanical passcode dialer or push-button mechanical passcode keypad that is mounted in vehicle and accessible from vehicle outside; an electronic key in the form of a card key, tag key, passcode or biometric for an electronic lock, wireless key with a built-in power source, portable electronic appliance with key software or key hardware of cell phone, smart phone, tablet, computer, smart watch, digital camera or digital multimedia player; and an electronic key identifier that is mounted in vehicle for the electronic key.

9 Claims, 6 Drawing Sheets

Related U.S. Application Data continuation of application No. 15/109,428, filed as application No. PCT/CN2014/094952 on Dec. 25, 2014, now Pat. No. 10,529,161.

(51) Int. Cl.

| | | |
|---|---|---|
| *E05B 81/82* | (2014.01) | |
| *E05B 81/80* | (2014.01) | |
| *G06F 3/02* | (2006.01) | |
| *G07C 9/23* | (2020.01) | |
| *B60R 25/20* | (2013.01) | |
| *B60R 25/23* | (2013.01) | |
| *E05B 17/10* | (2006.01) | |
| *E05B 49/00* | (2006.01) | |

(52) U.S. Cl.
CPC .............. *E05B 17/10* (2013.01); *E05B 47/00* (2013.01); *E05B 49/00* (2013.01); *E05B 81/80* (2013.01); *E05B 81/82* (2013.01); *G06F 3/021* (2013.01); *G06F 3/0219* (2013.01); *G06F 3/0227* (2013.01); *G07C 9/0069* (2013.01); *G07C 9/00174* (2013.01); *G07C 9/23* (2020.01); *E05B 2047/0058* (2013.01); *E05B 2047/0064* (2013.01); *G07C 2009/00325* (2013.01); *G07C 2009/00634* (2013.01); *G07C 2009/00793* (2013.01); *G07C 2209/62* (2013.01)

(58) Field of Classification Search
CPC ............. E05B 17/10; E05B 2047/0058; E05B 2047/0064; E05B 47/00; E05B 49/00; E05B 81/80; E05B 81/82; E05B 19/0082; E05B 19/04; B60R 25/209; B60R 25/23; B60R 25/24; B60R 16/037; B60R 2001/1223; B60R 2325/101; B60R 25/2009; B60R 25/2045; B60R 25/245; B60R 25/25; B60R 25/252; G06F 3/021; G06F 3/0219; G06F 3/0227; G06F 2200/1632; G06F 3/03545; G06F 3/0482; G06F 3/04883; B60K 2370/81; B60K 2370/816; B60K 2370/834; B60K 35/00; B60K 37/00; H01R 13/622; H01R 2201/26; H01R 24/86; B60N 3/14; H01H 2239/032; H03K 17/94; H03K 17/9622; H03K 2217/96054; H03K 2217/96058; H03K 2217/960785; H04L 2209/805; H04L 67/04; H04L 67/55; H04L 69/40; H04L 9/0838; H04L 9/3271; H04L 9/3297; H04W 12/069; H04W 12/61
See application file for complete search history.

(56) References Cited

U.S. PATENT DOCUMENTS

| | | | |
|---|---|---|---|
| 2017/0200334 A1* | 7/2017 | Buttolo | .................... G07C 9/21 |
| 2018/0323537 A1* | 11/2018 | Ma | .......................... B60K 37/00 |
| 2020/0233540 A1* | 7/2020 | Salter | ...................... B60R 25/23 |
| 2020/0291676 A1* | 9/2020 | Shah | .................. G07C 9/00563 |
| 2022/0203933 A1* | 6/2022 | Wang | ................. G07C 9/00563 |

* cited by examiner

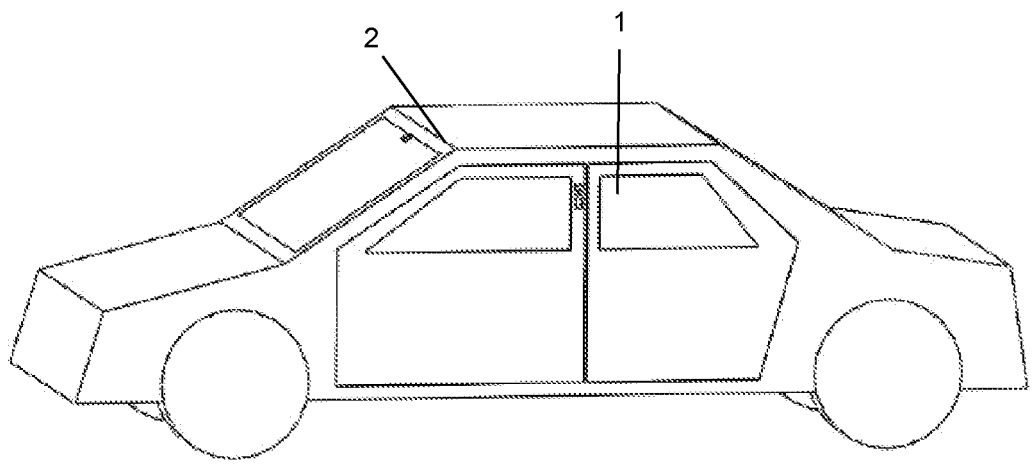
FIG.1
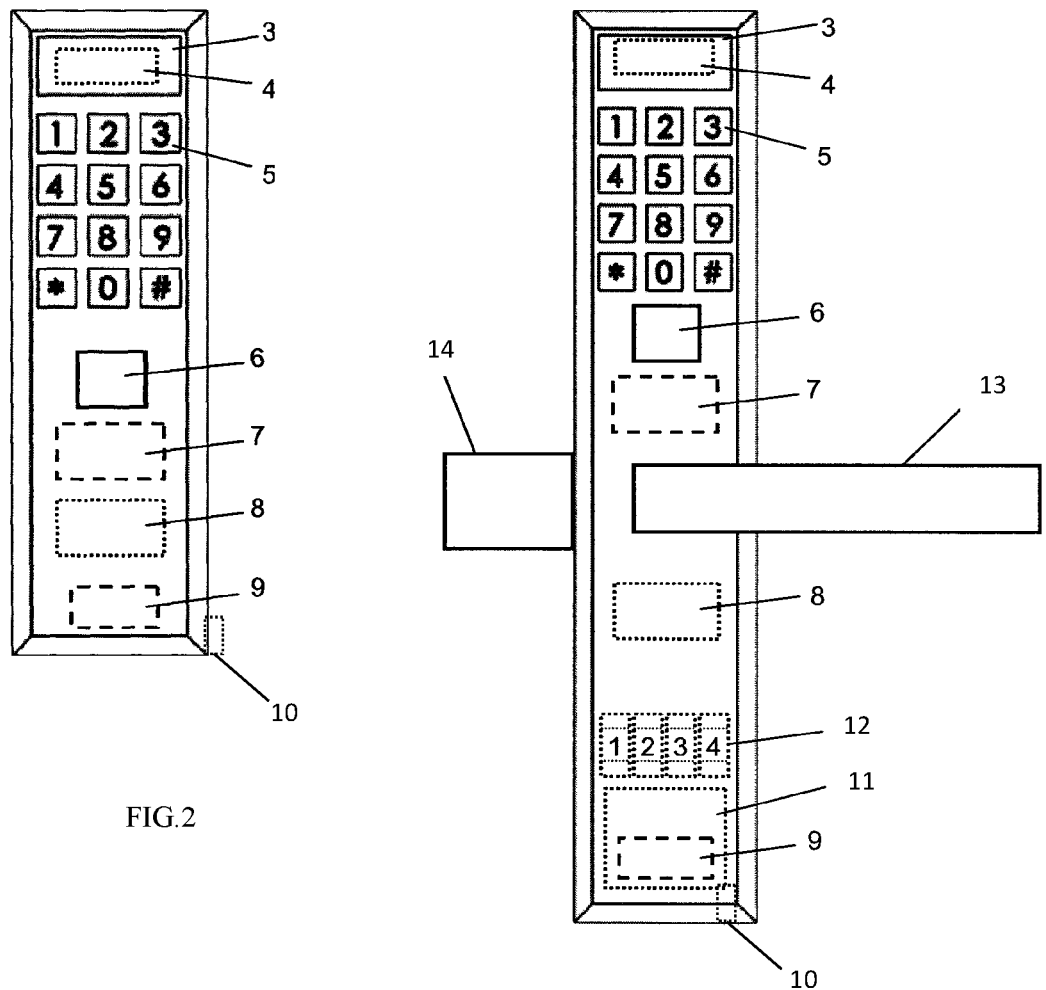
FIG.2
FIG.3

KEYS AND LOCKS

CROSS-REFERENCE TO RELATED APPLICATIONS

The present application is a continuation of U.S. patent application Ser. No. 16/734,401 filed on Jan. 5, 2020 (now U.S. Pat. No. 11,055,938), which is a continuation of U.S. patent application Ser. No. 15/109,428 filed on Sep. 5, 2016 (now U.S. Pat. No. 10,529,161), which is a national stage of International Application No. PCT/CN2014/094952 filed on Dec. 25, 2014, which claims priority to Chinese Patent Application Nos. 201410190211.6 filed on May 8, 2014, 201410045804.3 filed on Feb. 10, 2014, and 201310744115.7 filed on Dec. 31, 2013. The disclosures of these applications are hereby incorporated by reference in their entirety.

BACKGROUND

Car keys were previously mechanical keys to unlock door locks and start engines. Due to the poor security performance, now mechanical keys are not used a lot. For present new cars, remote keyless entry and keyless start system are mainly used. A key of remote keyless entry is here called remote key. A key of keyless start system is here called smart key. The remote key and smart key are electronic keys. Remote key and smart key internally include key security chip, so that their anti-theft performance is good in many cases. However, their anti-theft performance becomes even worse than the previous mechanical key if the electronic keys are lost. For example, the person who stole the remote key or smart key can easily find the car by pressing the door unlocking button from a far away distance and drive the car away. The remote key and smart key still include the mechanical key. When an old car is sold, the previous car owner can still open the car door with a spare mechanical key. If the mechanical key is lost, disabling the mechanical key takes time and money a lot. If the mechanical key is not disabled, whoever picked up the mechanical key can always take away the property inside the car. Remote key and smart key cannot be made for spare in most key stores, and the making in special stores takes high price and long time. Remote key and smart key are expensive. In comparison with mechanical key, remote key and smart key have poor waterproof, poor impact resistance, poor anti-electromagnetic interference ability, poor reliability because of built-in battery. Remote key and smart key are large and heavy, not convenient to carry.

Similar problems exist for the electronic keys for car, train, motorcycle, ship, aircraft and other vehicles, building, courtyard, safe, suitcase, bookcase, distribution box, equipment cabinet, drawer, container and other boxes and cabinets, padlock, chain lock and other independent locks.

Also, sometimes people forget and leave car mechanical key and remote key inside the car and lock the doors. The keys may also be lost. When the owner could not open the door and seek others for help, the owner needs spend time and money with psychological uneasiness. Especially, remote key and smart key are not interchangeable among car manufacturers, and the price is very expensive, so that many people are reluctant to spend money to buy spare car remote key and smart key.

In order to solve this problem, some cars mount an electronic keypad outside car door. However, most car electronic keypads are built-in type and expensive. The installation and removal generally are difficult for ordinary people and need professionals to do. Some cars mount electronic keypad with double-sided tape or adhesive outside car, however it is easily lost or stolen by other people. The present electronic keypad can unlock car door but cannot start engine. Therefore, now total popularity rate of automobile electronic keypad is very low. In addition, some house doors mount keypad door lock, but keypad and lock are not separated, installation and removal are complicated, with high cost and poor water resistance.

There are previous patents as follows. U.S. Pat. No. 7,362,211 B2, Huntzicker, F. W., 22 Apr. 2008. Door frame is used to prevent radio-electronic keypad from being stolen or lost, but the shape of the door frame is complicated, electronic keypad is still easy to lose, and easy to be squeezed to break by the door. U.S. Pat. No. 7,595,718 B2, Chen, T. H., 2 Sep. 2009. There are protrusions outside installation structure of electronic keypads, which occupy door edge space. It is inconvenient to use, and the installation is not firm. U.S. Pat. No. 8,410,897 B2, Popelard A., 2 Apr. 2013. Electronic keypad is mounted on car door handle. Installation and removal need professionals, and the cost is expensive. U.S. Patent No. US 20060238385 A1, Steenwyk, T. E., et al, 26 Oct. 2006, Electronic keypad is mounted on car mirror. Repair and replacement need professionals, and the cost is expensive.

In addition, when people leave home or a car, an item that is most often carried is a key. Keys have the type of mechanical key, electronic card key, remote control key, etc. In order to do unified management of keys, many people bundle several keys to a keychain and carry together. However, except for unlocking and locking, keys are not useful. A keychain with several keys, if coupled with one or more large car remote control key, its volume becomes large and its weight increases a lot. People feel inconvenient to place a large heavy keychain in their cloth pocket. The case becomes worse when they also carry other items, or when they do exercise, jogging, gymnastics, etc.

On the other hand, mobile phones, smartphones, tablet PCs and other smart watches and portable electrical appliances are also the most commonly carried several items. These items are versatile items with many uses, many things cannot be done without them. Thus, people like to carry them.

If mobile phones, smartphones, smart watches, tablet PCs and other portable appliances increase key feature, especially a portable electrical appliance has the feature of several keys and is able to unlock several locks, it becomes much more convenient for people carry and manage articles. However, since it does not work without electricity, the key function of mobile phone etc. is still not widely used.

SUMMARY

The present disclosure relates to key and lock systems, which can be used to car, train, motorcycle, ship, aircraft and other vehicles, building, courtyard, safe, suitcase, bookcase, distribution box, equipment cabinet, drawer, container and other boxes and cabinets, padlock, chain lock and other independent locks. The above-mentioned problems are the current technology deficiencies. Various embodiments disclosed herein provide a key and lock system with good anti-theft performance, time saving, less worry, low price, high reliability and ease use.

In an aspect, keys and locks are provided including:
one type or more of non-powered electronic key among non-powered magnetic card key, non-powered contact type IC card key, non-powered contactless card-shaped RFID tag key, non-powered contactless card-shaped RFID tag key, non-powered contactless other shape RFID tag key, and their integrated hybrid electronic key for vehicle lock;
electronic key identifier mounted on vehicle; and
one or more of vehicle electronic door lock and vehicle anti-theft system electronic lock;
wherein the key is identified by the key identifier to unlock the lock.

In some embodiments, the keys and locks include:
one type or more of non-powered electronic key, powered electronic key, electronic passcode key and biometric for lock;
one type or more of electronic key identifier and input keypad; and
vehicle electronic door lock, building electronic door lock, box or cabinet electronic door lock, or independent electronic lock;
wherein the key is identified by the key identifier to unlock the lock, no matter whether or not unlock vehicle anti-theft system electronic lock; and
the key identifier, the keypad or the lock, no matter whether or not powered by internal power supply, is powered by one type or more of ambient light solar power generation module, manual mechanical power generation module, thermoelectric power generation module, external replaceable battery mounted on one or more of wall, window, door of the vehicle, building, cabinet, the key identifier, the keypad and the lock, and external battery only for key and lock system through an external power connector mounted on the vehicle.

In some embodiments, the keys and locks include:
a rotary mechanical passcode door lock or push-button mechanical passcode door lock in a vehicle.

All of the electronic door locks of vehicle, building, box or cabinet, or electronic door lock of suite cabin, single cabin, suite room or single room are not the locks that are unlockable by mechanical key.

The electronic key reader, electronic passcode input keyboard, or biometric identifier, installed on one place or more inside or outside the vehicle, building, box, cabinet or independent electronic lock, do wired or wireless communication with the electronic door locks or independent electronic lock or electronic lock of vehicle anti-theft system; and
their electric power source, commonly shared with the electronic door lock or independent electronic lock or separately, is powered by one or more of the internal power supply, power generation module, replaceable battery and external battery.

The powered electronic key, an electronic passcode key, or biometric identification device, is portable; and
their electric power source, is powered by one or more of the power generation module, removable and non-removable battery.

The electronic key, electronic keyboard or biometric identifier, is a function of a portable electrical device, with one or more of built-in electronic key device and software;
by entering a passcode or without passcode, do unlocking by one or more of remote control, hands-free and hand-held approaching.

The lock unlockable by the portable key or portable electronic device, is unlocked by one or more of the electronic key identifier, electronic passcode keyboard, and biometric identifiers with mounting on same object.

Portable remote key with built-in battery, keyless start system key with built-in battery, independent electronic lock, or other portable electronic device with key function, is sealed by one or more of rubber O ring pressing, rubber gasket pressing, plastic housing integrally molding, plastic welding, metal welding and bonding, in order to prevent water and gas from outside into interior.

For vehicle door lock or vehicle anti-theft system lock, owner himself is able to pair electronic key, or register passcode, or register biometric, with one or more of following characteristics:
(1) mechanical passcode registration of mechanical code door locks, need to be done inside or outside door after the door is opened; and
(2) electronic key pairing, or electronic passcode registration or biometric registration, need to use one or more of pairing mechanical key, magnet card key, IC card key, RFID tag key, pairing passcode and biometric.

Owner sets limited valid period or limited valid times of a non-powered electronic key, or powered electronic key for vehicle lock.

On the outer surface of a portable, non-powered or powered, original authentic electronic key, there is no any brand identity or model identity of vehicle, building, building door lock, cabinet, box, cabinet lock, box lock, or independent electronic lock.

In some embodiments, the keys and locks include:
an electronic passcode input keyboard key that is used to unlock vehicle or building lock mounted on the mounting hole on outer wall of vehicle or building;
the keyboard is operated from outside by people, but is not able to be removed or opened from outside; and
the keyboard is able to be removed or replaced from inside, by regular people directly seeing mounting fastener or its cover without need of special manual.

The keyboard is mounted by screw, nut or mounting pin, to one or more mounting holes on people's access door, cargo door, cabinet door, box door and their surroundings.

The keyboard housing is sealed by one or more sealing process of rubber ring pressing, plastic molding, plastic welding, metal welding and adhesive bonding, in order to get waterproof.

In some embodiments, the keys and locks include:
an optical type electronic passcode input keyboard key that is used to unlock vehicle or building lock, with each button having a pair of light emitter and light receiver close to each other;
inside the light emitter and light receiver, a lens or aperture is mounted close to the light-emitting surface and photosensitive surface, to reduce the light emission angle and light receiving angle; and
when the key is touched by a pointing object, the reflection of the pointing object makes the light emitted from the light emitter into the light receiver.

The optical keyboard having one or more features as follows:
(1) a band-pass filter layer with the light emitting wavelength is mounted close to the surface of the light receiver in order to block ambient light with other wavelengths from entering the light receiver;
(2) the light emitter gives a high frequency pulse light and the light receiver receives the pulse light while filtering ambient light of approximate direct current;
(3) the light emitter is a light emitting diode; and
(4) the light receiver is a photodiode or phototransistor.

The electronic passcode key made of the optical keyboard is mounted inside of the window glass of vehicle or building, and people stay outside window to use pointing objects for the operation.

The electronic passcode input keyboard at least having the keys of 0 to 9, by key operations, do one or more of locking door, unlocking door, starting engine, and starting air-conditioner.

The electronic passcode input keyboard is a module separated from electronic lock module, and the electrical communication between them is one or more of wire connection, fixed code and rolling code wireless radio communication.

The electronic passcode input keyboard has an identifier for one or more of non-powered electronic key, powered electronic key and biometric for unlocking.

With electronic passcode keyboard key mounted outside a vehicle or carried by a person that is used to unlock vehicle lock, after entered the passcode of unlocking vehicle door, do one or more operation within a set time as follows:
(1) enter the engine start passcode to start the engine directly;
(2) within the set time after started engine, enter air conditioner start passcode to start the air conditioner directly; and
(3) enter the passcode of temporarily unlocking vehicle anti-theft system, and then start engine by pushing button, turning knob or shifting switch on vehicle dashboard or around within a set time.

An electronic passcode input keyboard key that is used to unlock vehicle lock is mounted on vehicle driver dashboard or around,
where one enters the engine start passcode to start the engine directly; or
enters the passcode of temporarily unlocking vehicle anti-theft system, and then start engine by pushing button, turning knob or shifting switch on vehicle dashboard or around within a set time.

The buttons of an electronic passcode keyboard key that is used to unlock vehicle or building lock mounted outside or inside vehicle or building are usually in inoperable status; one moves the door lock handle to send a signal to the keyboard and let the buttons become in operable status; and
after a set time, the buttons return to inoperable status.

The electronic passcode input keyboard is paired with locks of one or more of product brands, to unlock the locks.

An owner uses one or more of pairing mechanical key, magnet card key, IC card key, RFID tag key, electronic chip, pairing passcode and pairing biometric to pair the electronic passcode key with the electronic lock of vehicle or building or set passcode.

One or more portable electronic appliances of cell phone, smart phone, tablet, computer, smart watch, digital camera and digital multimedia player with one or more of key electronic device and key software inside; and
by rolling code identification method,
the portable electronic appliance unlocks an electronic lock of one or more of vehicle door, vehicle anti-theft system, vehicle engine, vehicle air conditioner, vehicle running recorder, garage door, building door, box cover, cabinet door, video machine, building air conditioner and power supply switch controller,
with one or more of passcode, passcode free and biometric, with one or more of remote control, hands-free and hand-held approaching operation.

The portable electronic appliance unlocks an electronic lock by fixed code, with one or more of passcode, passcode free and biometric, and with one or more of remote control, hands-free and hand-held approaching.

The portable electronic appliance unlocks the lock by one or more of remote control key radio frequency communication, RFID, infrared communication, Bluetooth, WIFI communication and mobile communication.

An owner uses one or more of pairing mechanical key, magnet card key, IC card key, RFID tag key, pairing passcode and pairing biometric to let the electronic lock be in pairing status; and in this status, pair the portable electronic appliance with the electronic lock by pairing, un-pairing, locking passcode setting, unlocking passcode setting, passcode operation setting or passcode free operation setting.

The portable electronic appliance includes one or more of mechanical and software panic buttons, electronic devices of remote control key radio frequency communication, anti-theft chip of remote control key, pairing and setting of remote control key, and operation software.

The portable electronic appliance is paired and used with one or more of electronic locks; and one or more of electronic lock number, description of each electronic lock, locking and unlocking passcode, passcode operation and passcode free operation are set.

The portable electronic appliance, for vehicle electronic lock, do one or more operation as follows:
(1) unlock or lock door lock with passcode or without passcode;
(2) after unlock door lock, with passcode or without passcode, unlock engine anti-theft electronic system lock and directly start the engine;
(3) after unlock door lock, with passcode or without passcode, unlock engine anti-theft electronic system lock, then within a set time, start the engine by pushing button, turning knob or shifting switch with hand on vehicle dashboard or around;
(4) without unlocking door lock, with passcode or without passcode, unlock engine anti-theft electronic system lock and directly start the engine;
(5) after start the engine, with passcode or without passcode, directly start air conditioner; and (6) before or after start the air conditioner, set air conditioning temperature.

The portable electronic appliance, do one or more operation as follows:
(1) when carrying the portable electronic appliance close to an electrical door lock, the door lock gets unlocked automatically; and
(2) when carrying the portable electronic appliance close to a vehicle driving seat, engine anti-theft electronic system lock gets unlocked automatically, then start the engine by pushing button, turning knob or shifting a switch with hand on vehicle dashboard or around.

The portable electronic appliance, for different electronic locks, do key operation and approaching operation in hybrid;
the portable electronic appliance selects key operation, approaching operation or both operation in setting option; and
for the electronic lock, when key operation and approaching operation perform simultaneously, the key operation takes priority over approaching operation.

The portable electronic appliance sends request signal by key operation to one or more of electronic lock, and after the electronic lock received the request signal, the electronic lock feedbacks one or more of door lock unlocking status, vehicle anti-theft system unlocking status, engine running status, air conditioner running status, air conditioner set temperature, measured ambient temperature, electronic lock location, logger data and their historical data.

In some embodiments, the portable electronic appliance includes mechanical unlocking button.

With the portable electronic appliance, within a set time after did one or more of passcode input and biometric identification, no matter whether the portable electronic appliance is in working or sleep condition, one pushes the mechanical unlocking button to do unlocking operation.

A key and lock set for a vehicle includes:
(1) a vehicle lock set with both vehicle door lock and vehicle engine start lock;
(2) a passcode for mechanical lock;
(3) a rotary mechanical passcode dialer or push-button mechanical passcode keypad that is mounted in vehicle and accessible from vehicle outside;
(4) an electronic key in the form of a card key, tag key, passcode or biometric for an electronic lock, wireless key with a built-in power source, portable electronic appliance with key software or key hardware of cell phone, smart phone, tablet, computer, smart watch, digital camera or digital multimedia player;
(5) an electronic key identifier that is mounted in vehicle for the electronic key;
wherein:
both the vehicle door lock and the vehicle engine start lock are configured to be unlocked by the electronic key upon a match identification by the electronic key identifier, regardless of whether the passcode for the mechanical lock is configured to unlock the vehicle door lock;
the vehicle door lock is configured to be unlocked by the passcode for the mechanical lock upon the passcode match identification by the mechanical dialer or keypad, regardless of whether the electronic key unlocks the vehicle door lock or the vehicle engine start lock; and
the passcode for the mechanical lock is able to unlock the vehicle door lock in the case that the electronic key is unable to unlock the vehicle door lock due to electricity shortage or device malfunction of the electronic key identifier or the vehicle door lock.

The key and lock set is characterized as follows:
(1) the key and lock set is configured for a door;
(2) the key and lock set further includes a keyboard mounted outside the door configured to access the lock by accessing from outside the door;
(3) the keyboard is not removable from outside the door; and
(4) the keyboard is removable from inside the door through a mounting fastener or a cover.

The key and lock set is further characterized as follows:
(1) the door is a vehicle or building door; and
(2) the keyboard is mounted on the vehicle or the building.

The key and lock set includes a keyboard that is mounted outside the vehicle or the building at an area other than the door.

The key and lock set includes a keyboard that is mounted outside the vehicle or the building at an area on the door.

A vehicle includes the key and lock set, wherein:
(1) the key and lock set is configured for a door;
(2) the key and lock set further includes a keyboard mounted outside the door configured to access the lock by accessing from outside the door;
(3) the keyboard is not removable from outside the door; and
(4) the keyboard is removable from inside the door through a mounting fastener or a cover.

The vehicle which includes the key and lock set is further characterized as:
(1) the door is a vehicle door; and
(2) the keyboard is mounted on the vehicle.

In some embodiments, the keyboard is mounted outside the vehicle at an area other than the door.

In other embodiments, the keyboard is mounted outside the vehicle at an area on the door.

A key and lock set for such a vehicle includes:
(1) a vehicle lock set with both a vehicle door lock and a vehicle engine start lock;
(2) an electronic key in the form of a card key, tag key, passcode or biometric for electronic lock, wireless key with a built-in power source, portable electronic appliance with key software or key hardware of cell phone, smart phone, tablet, computer, smart watch, digital camera or digital multimedia player;
(3) an electronic key identifier of an electronic key reader, an input keypad or identifier that is mounted in vehicle for the electronic key;
(4) a vehicle internal power supply; and
(5) a vehicle external power supply, of solar power generation module, hand crank generator, thermoelectric power generator, external replaceable battery, or connector for external power supply;
wherein:
both the vehicle door lock and the vehicle engine start lock are configured to be unlocked by the electronic key upon the match identification from the electronic key reader, input keypad or identifier;
the electronic key reader identifier, the vehicle door lock and the engine start lock are powered by the vehicle internal power supply;
the vehicle door lock and the electronic key identifier for the vehicle door lock are powered by the vehicle external power supply; and
the vehicle door lock and the electronic key identifier for the vehicle door lock are powered by only the vehicle external power supply in the case of electricity shortage or device malfunction in the vehicle internal power supply.

The key and lock set further includes an electronic passcode input keypad that is mounted inside the vehicle and accessible from outside of the vehicle, wherein:
the vehicle door lock is configured to be unlocked by the lock passcode upon the passcode match identification by the keypad, regardless of whether the electronic key unlocks the vehicle door lock or the vehicle engine start lock;
both the vehicle door lock and the vehicle engine start lock are configured to be unlocked by the electronic key upon the match identification by the electronic key identifier, regardless of whether the lock passcode is configured to unlock the vehicle door lock;

The key and lock set further includes an electronic passcode input keypad that is mounted inside the vehicle and accessible from inside of the vehicle, wherein:
the vehicle engine start lock is configured to be unlocked by the lock passcode upon the passcode match identification by the keypad, regardless of whether the electronic key unlocks the vehicle door lock or the vehicle engine start lock;
both the vehicle door lock and the vehicle engine start lock are configured to be unlocked by the electronic key upon the match identification by the electronic key identifier, regardless of whether the lock passcode is configured to unlock the vehicle engine start lock;

A key and lock set for such a vehicle further includes:
(1) an electronic lock set with both vehicle door lock and vehicle engine start lock;

(2) a near access electronic key, in the forms of a contactless RFID card, contactless RFID key tag, contact type IC card, contact type magnetic card, passcode or biometric for lock;

(3) a near access electronic key identifier set comprised of an electronic key reader, an input keypad or an identifier that is mounted inside the vehicle with one accessible from outside of the vehicle for the vehicle door lock and another accessible from inside of the vehicle for the vehicle engine start lock;

(4) a far access electronic key, in the forms of a portable electronic appliance with key software or key hardware, of cell phone, smart phone, tablet, computer, smart watch, digital camera or digital multimedia player;

(5) a far access electronic key identifier set mounted inside the vehicle, which is accessible from outside of the vehicle for the vehicle door lock and is accessible from inside of the vehicle for the vehicle engine start lock;

wherein:

both the vehicle door lock and the vehicle engine start lock are configured to be unlocked by the near access electronic key upon an identified match by the near access electronic key identifier of the electronic key reader, the input keypad or the identifier;

the paired match identification between the near access electronic key and the near access electronic key identifier is configured to have a valid time period, a limited number of usages, or unlimited usage;

the paired match identification configuration of the near access electronic key identifier accessible from outside of the vehicle is the same or different from that accessible from inside of the vehicle;

both the vehicle door lock and the vehicle engine start lock are configured to be unlocked by the far access electronic key upon the match identification by the far access electronic key identifier, by key operation, or by approaching operation with rolling code or fixed code wireless identification method; and the near access electronic key and the far access electronic key are configured to unlock both the vehicle door lock and the vehicle engine start lock independently.

The key and lock set also includes an electronic passcode input keypad that is mounted inside of the vehicle and accessible from outside of the vehicle, wherein:

the vehicle door lock is configured to be unlocked by the lock passcode upon the passcode match with the keypad, regardless of whether the near access or/and far access electronic key unlocks the vehicle door lock or the vehicle engine start lock;

both the vehicle door lock and the vehicle engine start lock are configured to be unlocked by the near access or/and far access the electronic key upon the match identification by the electronic key identifier, regardless of whether the passcode for lock is configured to unlock the vehicle door lock;

The key and lock set also includes an electronic passcode input keypad that is mounted inside of the vehicle and accessible from inside of the vehicle, wherein:

the vehicle engine start lock is configured to be unlocked by the lock passcode upon the passcode match with the keypad, regardless of whether the near access or/and far access electronic key unlocks the vehicle door lock or the vehicle engine start lock;

both the vehicle door lock and the vehicle engine start lock are configured to be unlocked by the near access or/and far access electronic key upon the match identification with the electronic key identifier, regardless of whether the passcode for lock is configured to unlock the vehicle engine start lock;

BRIEF DESCRIPTION OF THE DRAWINGS

FIG. 1 shows a key input assembly and a solar panel installed on a car.

FIG. 2 shows the key input assembly that is provided with the solar panel, a rechargeable battery, a passcode input keyboard, a fingerprint recognition device, an RFID tag key reader, a remote control key receiver and an outside replaceable battery.

FIG. 3 shows a multi-functional building door lock.

DETAILED DESCRIPTION

Figures 4, 5:
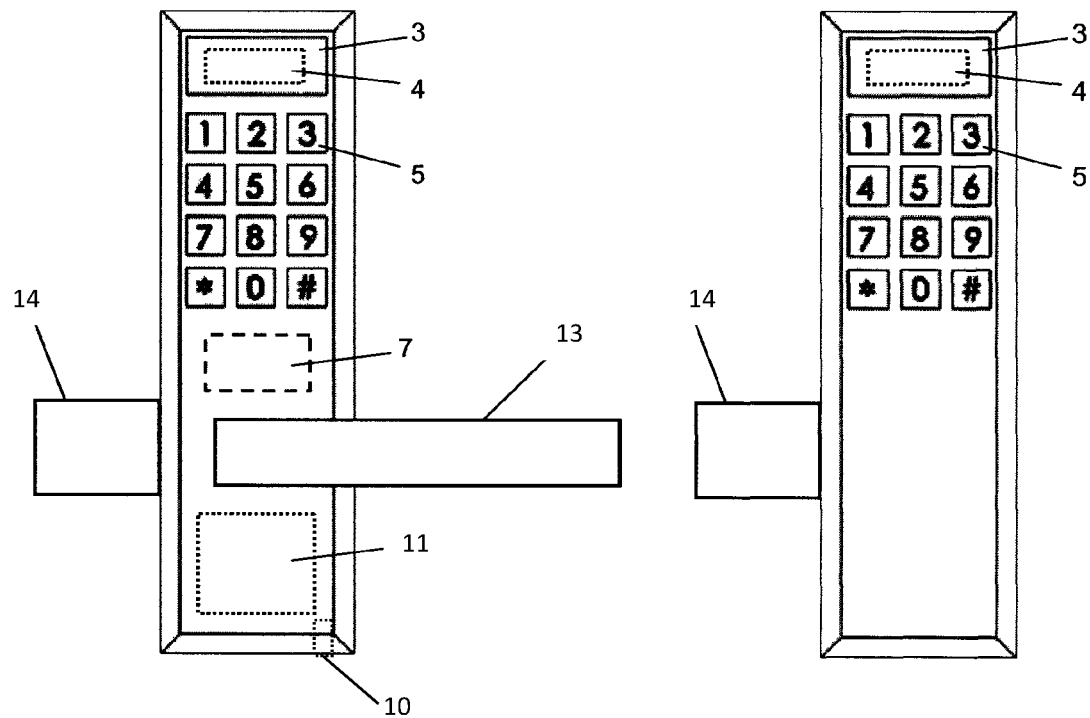
FIG. 4 shows an electronic door lock having a basic function.
FIG. 5 shows an electronic passcode door lock with low cost.

FIG. 1 shows a key input assembly and a solar panel installed on a car. Item 1 is the key input assembly installed on a car door. Item 2 is the solar panel installed on an inner side of a front window glass of the car. FIG. 2 shows the key input assembly that is provided with the solar panel, a rechargeable battery, a passcode input keyboard, a fingerprint recognition device, an RFID tag key reader, a remote control key receiver and an outside replaceable battery. Item

3 is the solar panel. Item 4 is a built-in rechargeable battery, for example, 9V rechargeable battery, which is charged by the solar panel or an internal power supply in the car, and cannot be removed from the outside of the car, so as to prevent being removed by people. A solar power generation assembly generally consists of the solar panel as well as the rechargeable battery and a rechargeable capacitor which can store electricity. Item 5 is the passcode input keyboard. Item 6 is the fingerprint recognition device. Item 7 is the RFID tag key reader, wherein the RFID tag key can unlock the door lock when being held by hands within 2 cm to the door lock, and can unlock the door lock without being held by hands within 60 cm to the door lock. Item 8 is the remote control key receiver, wherein the keypad of the remote control key can be operated to unlock the door lock when the remote control key is positioned 30 meters away from the car. The RFID tag key reader 7 and the remote control key receiver 8 belong to electronic key readers. Item 9 is a built-in replaceable battery, wherein a battery cover can be opened outside the car, for example a 9 V battery. Item 10 is an external power supply socket, for example a 3.5 mm socket, or pure positive and negative electrodes. The external power supply is connected with the external power supply socket for emergency power supply for the key input assembly, and after power supplying is finished, the external power supply is separated from the external power supply socket.

FIG. 3 shows a multi-functional building door lock. Compared with the embodiment illustrated in FIG. 2, the embodiment illustrated in FIG. 3 adds a battery 11 which can be opened and replaced inside, a mechanical passcode dial plate 12, as well as a lock lever handle 13 and a lock tongue 14 of the door lock. The door lock does not need urban electricity, but the battery 11, for example, 4 pieces of AA type batteries should be used to provide main power supply for work. The solar panel 3 and the built-in rechargeable battery 4, the battery 9 which is opened and replaced outside, and the external power supply socket 10 can provide emergency power supply. The mechanical passcode dial plate 12 is used for unlocking the door lock by the input of correct mechanical passcode when the electronic key, the electronic passcode and a fingerprint unlocking system fail to unlock the lock. Because unlocking the lock with a mechanic passcode does not consumes electricity, and the unlocking operation speed is low, it is not used as a general unlocking manner but an emergency unlocking manner. Therefore, the mechanical passcode dial plate 12 can be hidden behind one cover for a beautiful surface. When the handle 13 of the door lock is rotated, the lock tongue 14 of the door lock is retracted to the door lock, and then pushing or pulling is performed to open the door. When the handle 13 is released, the lock tongue 14 of the door lock is ejected out by a spring and extends into a door frame, and the door cannot be pushed or pulled open.

FIG. 4 shows the electronic door lock with a basic function. According to the unlocking method, only the RFID tag key and passcode without power supply are adopted. The battery 11 provides main power supply for work. The solar panel 3 and the built-in rechargeable battery 4 provide main power supply for work and emergency. The external power supply socket 10 provides the emergency power supply. This door lock is suitable for a safe box and a safe cabinet.

In order to further reduce cost, one of the RFID tag key reader 8 and the passcode input keyboard 5 can be omitted, and the battery 11 and the handle 13 can be omitted. FIG. 5 shows an electronic passcode door lock with low cost, which can be unlocked only with electronic passcode. When the lock is unlocked, the lock tongue 14 enters, and when the lock is locked, the lock tongue 14 is ejected. The solar panel 3 and the built-in rechargeable battery 4 provide power supply for work and emergency. This lock can be used as a low-cost lock for a cabinet.

Figure 6:
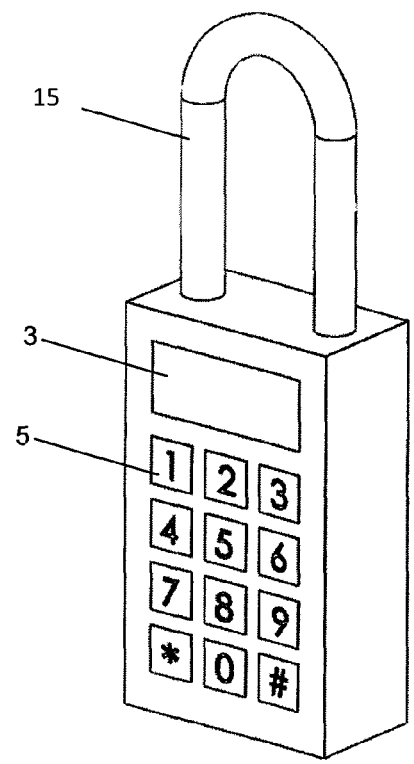
FIG. 6 shows an independent electronic passcode padlock.

The electronic passcode lock of FIG. 5 is transformed and changed to a standalone electronic passcode padlock as shown in FIG. 6. Item 15 is a hook of the lock, which opens when the lock is unlocked. When the lock is locked, the hook closes. The hook can be replaced with a chain, and then the lock will become a standalone electronic passcode chain lock. In the standalone electronic passcode lock, the solar panel 3 and the built-in rechargeable battery 4 (not shown) provide power supply for work and emergency, and they are not removable, unless destroyed. The passcode includes an unlocking passcode and an optional owner passcode. The owner passcode may be provided by a manufacturer and used to set or change the unlocking passcode. For security reasons, the owner passcode cannot directly unlock the lock. In order to achieve the long-term reliable operation of the standalone electronic passcode lock, its electrical and precision machinery parts may be sealed with one or more processing techniques of rubber rings, rubber gaskets, integral forming of plastic housing, plastic welding, bonding and metal welding, so as to prevent water or vapor from entering into the inside.

Passenger doors and cargo compartment doors of the car may be conveniently opened with electronic door locks. Various embodiments of the present disclosure provide a non-powered electronic key. For example, mark functions of a non-powered magnetic card, a non-powered contact type IC card, a non-powered contactless card shaped RFID tag, a non-powered contactless key plate shaped RFID tag, a non-powered other-shaped RFID tag and an integrated hybrid electronic tag combined thereof, may be used to form the key. The non-powered electronic key, which has low price and small volume, is portable, and has good reliability, will be the mainstream of car keys. They are usually provided at lower prices than that of mechanical keys, their security generally much better than the mechanical keys, and some of them cannot even be decrypted and counterfeited by eavesdropping.

The non-powered RFID tag key being contactless is more convenient to use than the contact type magnetic key and the contact type IC card key. The non-powered contactless RFID tag key with a chip containing no CPU is also known as a non-powered contactless IC tag key and may be cracked, with poorer security. The non-powered contactless RFID tag key with a chip containing a CPU is also known as a non-powered contactless CPU tag key, and substantially may not be counterfeited with good security due to CPU processing for cryptographic operations. Here, the CPU is the abbreviation for Central Processing Unit, and is also known as the central processor.

However, when the car is out of power, the unlocking methods of the non-powered electronic key, a powered electronic key, the electronic code and a biometric characteristic will not work. When one or more of the non-powered electronic key, the powered electronic key, the electronic passcode and the biometric characteristic is used to unlock an electronic door lock of a vehicle, of a building, or of a cabinet, or a separate electronic lock, regardless of unlocking an vehicle anti-theft system electronic lock or not, a high-capacity internal power supply, such as a generator plus a rechargeable battery, urban electricity, and a high-capacity battery, may be used to supply power to the electronic door lock. In case the internal power supply is out of power, for example, a car not driven for a long time, all the power of the internal battery will be automatically discharged. It will be a big problem when one cannot open the electronic door lock of the vehicle, of the building, or of the cabinet, or the separate electronic lock. To this end, various embodiments of the present disclosure propose, regardless of the internal power supply, a method to power the electronic door lock with the solar power generation assembly generating power from the external light, a manual mechanical power generation assembly, or a thermoelectric power generation assembly, which are installed in one or more of the wall, the window, the door, the electronic door lock, the electronic key reader, the electronic passcode input keyboard and the biometric characteristic of the vehicle, the building, the cabinet, or the separate electronic lock. Various embodiments of the present disclosure also provide a method to power the electronic door lock with a battery removable from the outside and built in one or more of the wall, the window, the door, the electronic door lock, the electronic key reader, the electronic passcode input keyboard and the biometric characteristic. For cars, motorcycles and other vehicles, the external power supply socket can be installed and connected to the external power supply for powering the electronic door lock. The fact that one of these types of power supply is available can solve the problem. If two or more types are available, reliability for power supply will be much higher.

Herein, the wall means walls of the housing of the vehicle or building or the cabinet or the separate electronic lock, including top, bottom, left, right, front and back walls, such as walls of the building. The cabinet means various boxes and cabinets with locks, such as safe boxes, safe cabinets, suitcases, bookcases, distribution boxes, equipment cabinets, drawers and containers. The solar power generation assembly generally consists of the solar panel and the rechargeable battery, or may only consist of the solar panel without the rechargeable battery. Further, the rechargeable capacitor may store power for a short time and may replace the rechargeable battery in some cases. As long as there is light when the car is in the outdoor or a garage, the solar panel can generate power for charging the rechargeable battery or powering the door lock. The rechargeable battery may be installed in the car and charged by one or more of the internal power supply and the solar panel. The replaceable battery, for example, a 9V battery, built in the car needs waterproof protection, e.g. the battery cover is sealed with a rubber ring or a rubber gasket. The replaceable battery generally requires periodic replacement. The manual mechanical power generation assembly generates power, for example through repeated shaking or pulling of the door handle, and the power may be stored in the rechargeable battery or the rechargeable capacitor. The thermoelectric power generation assembly enables temperature difference between the inside and outside of the car with heating, e.g., by touching the key input assembly with a hand or other heating methods, to generate power.

At present, many cars are standardly provided with remote control keys or keys with keyless starting systems, which internally contain vehicle anti-theft chips, which are good in anti-theft performance under many conditions, but are poorer in anti-theft performance than that of the original mechanical keys when the keys are lost. For example, a person stealing a key can easily find a car in the distance by pressing a door open button of the key, and then drive the car away. Therefore, the present disclosure provides composite unlocking means of the electronic key, the electronic passcode and the biometric characteristic. When a car owner considers that it is necessary to improve the vehicle anti-theft grade because important articles are placed in the car or the car is expensive, the car owner sets the mode that the door lock and the anti-theft system electronic lock can be unlocked by simultaneously using the electronic key, the passcode and the biometric characteristic. Thus, the car is also protected by the passcode or the biometric characteristic even if the electronic key is lost. The car is also protected by the electronic key or the biometric characteristic even if the passcode is known by other people. The car is also protected by the electronic key or the passcode even if a bad finger is misjudged to be a good finger through biometric characteristic recognition. When the car owner considers that a high anti-theft grade is unnecessary, the door lock of the car and the anti-theft system electronic lock can be unlocked through at least one of the electronic key, the passcode, or the biometric characteristic. For example, it is very convenient when the car owner lends the electronic key to other people, the car is driven back by other people, and the electronic key is returned. It is also very convenient that a temporary passcode is given to other people to unlock the door or the car and the passcode is invalid after exceeding the time limit. If the key of the car is locked in the car, the car owner unlocks the door lock by using the passcode to take out the key. If the car owner often loses the key, the door lock of the car and the anti-theft system electronic lock can be unlocked by the passcode and the biometric characteristic. A child serving as a middle school student can enter the car by unlocking the door lock by using the door lock passcode, but an engine cannot be started if the passcode for the anti-theft system electronic lock and the electronic key are not provided.

The present car still retains the function of the mechanical key for unlocking the door lock of the car although being provided with the remote control key or the key with the keyless starting system, and the original car owner can still unlock the door by using a standby mechanical key when the old car is sold. If the mechanical key is lost, invalidating the mechanical key needs to replace a lock cylinder or the whole lock. Thus, the working time is long, and the price is high. If the lost mechanical key is not invalidated, the person picking up the mechanical key can unlock the door lock of the car at any time to take away properties in the car. Therefore, Various embodiments of the present disclosure provide a vehicle such as a car provided with a rotary mechanical passcode door lock or a keypad type mechanical passcode door lock. The mechanical passcode can be changed by the car owner if it is known by other people, so that the method is easy and cheap compared with the method of replacing the mechanical lock cylinder or the whole lock.

An electronic key reader, an electronic passcode input keyboard or a biometric characteristic recognizer is arranged outside the vehicle, the building, the cabinet or the independent electronic lock such as the car door to unlock the door lock of the car and the vehicle anti-theft system electronic lock. Wire communication or wireless communication with the electronic door lock or the vehicle anti-theft system electronic lock is realized. All the assemblies can work under the supply of electricity. A power supply of all the assemblies is same as or different from the power supply of the electronic door lock, and power can be supplied by the high-capacity internal power supply. However, no matter whether the power is supplied by the internal power supply or not, the power is supplied by one or more of the power generation assembly, the replaceable battery and the external power supply socket.

One and more of the electronic key reader, the electronic passcode input keyboard and the biometric characteristic recognizer can form one assembly or separate assemblies together with one or more of the electronic door lock and the vehicle anti-theft system electronic lock.

In order to provide convenience for a person to enter the car through a left door and a right door, the left door and right door of the car can be respectively provided with one set of the electronic key reader or the electronic passcode input keyboard or the biometric characteristic recognizer.

Except for the outside of the car, the electronic key reader, the electronic passcode input keyboard or the biometric characteristic recognizer can also be arranged on an instrument panel that is also called dashboard inside the car and around so as to facilitate the driver to unlock the vehicle anti-theft system electronic lock and the like. Wire communication or wireless communication with the electronic door lock or the anti-theft system electronic lock is realized. The power is supplied by one or more of the internal power supply of the car, the power generation assembly and the replaceable battery. For example, an electronic passcode input keyboard is combined with a car audio and video device or a satellite navigation device to form a device.

The car anti-theft system electronic lock can also be unlocked by using the electronic key, the electronic passcode or the biometric characteristic through the electronic key reader, the electronic passcode input keyboard or the biometric characteristic recognizer arranged on each car door. In order to reduce the cost, no electronic key reader, electronic passcode input keyboard or biometric characteristic recognizer is arranged inside the car, however, the convenience is a little poor.

Once the power supply problems of the electronic key reader, the electronic passcode input keyboard, the biometric characteristic recognizer, the electronic door lock, and the standalone electronic lock are solved by using the above-mentioned internal power supply, the power generation assembly, the replaceable battery, and the external power supply socket, the lock or the door lock can be unlocked outside. Therefore, the present disclosure suggests that the mechanical key lock should no longer be installed. Any door locks or standalone electronic locks of the whole, suite compartments, single compartments, suites, single rooms, suite chambers, and single chambers of the vehicle or the building or the cabinet are not the locks that can be unlocked by mechanical keys. That can avoid the problems of inconvenience to carry and loss of the mechanical key and improve the vehicle anti-theft performance. With poor anti-theft performance, locksmiths and even ordinary people are able to easily and non-destructively unlock a mechanical lock within a short time. However, some people worry about the breakdowns occurred when the above-mentioned electronic key, the electronic passcode, the biometric characteristic or the mechanical passcode unlocks the lock, so they want to reserve the mechanical key lock as one more means to unlock the lock or open the door.

For a portable powered electronic key, or the electronic passcode input keyboard, or the biometric characteristic recognizer, its power supply is powered by one or more of the power generation assembly, a removable or non-removable battery, and the external power supply socket.

With one or more of key electronic devices and key software built in, the powered electronic key, or the electronic passcode input keyboard, or the biometric characteristic recognizer is one function of the portable electric appliance of a special key assembly, the cellphone, a tablet computer, a computer, a watch, a digital camera, a digital multimedia player, a satellite navigator, and the like, and the portable electric appliance is unlocked by one or more of a inputting passcode or no passcode, a remote control operation, a hands-free approaching and a hand-held approaching. One can also press a panic button to realize an acousto-optic panic alert. It is easy to use a multi-functional portable electric appliance with key function to set passcode, and set individual or composition operation methods of the electronic key, the electronic passcode and the biometric characteristic.

The wireless communication between the portable electric appliance with key functions and the car are one or more of a RFID, a radio frequency communication, an infrared light communication, a Bluetooth communication, a WIFI communication, a cellphone ground-based communication, and a cellphone satellite communication. A communication distance of RFID tags is related to the presence or absence of the power supply, and the parameter of a frequency, a reader's power, an antenna size, an antenna orientation, a tag performance, and so on. A portable electric appliance can include multiple sets of RFID chips and antennas. The portable electric appliance can operate the keypad to communicate with the car, that is, a remote control operation. For some RFID tag keys with power supplies, their communication distances can be up to more than 30 meters. The communication distances of some RFID tags with and without power supplies range from 50 cm to 100 cm. At this time, the portable electric appliance can be put into a handbag or a pocket. When a portable electric appliance is 60 cm away from a car outside, the door lock is unlocked; when a portable electric appliance is approaching the driver position inside the car, car anti-theft system lock is unlocked. It's convenient because the portable electric appliance doesn't need to be brought out of the handbag or the pocket from beginning to end. That's called hands-free approaching identification operation. As to some RFID tag keys without power supplies or RFID tag keys with power supplies but dead batteries, when the communication distance is below 2 cm, one should hold the portable electric appliance including such RFID tag key to approach the RFID reader of the car or the building or the cabinet or the standalone electronic lock to communicate, so as to unlock the door lock or the standalone electronic lock or the car anti-theft system lock. That's called hand-held approaching identification operation.

In the case of using the portable key or the cellphone or other portable electric appliances to unlock the lock, because cellphones and the like consume large power, their batteries may just run out of power when one wants to unlock the lock. It would be a big problem that battery charging is time consuming and the worse thing is that it is impossible to charge the battery at that time. However, if the electronic key recognizer, or the electronic passcode key input keyboard, or the biometric characteristic recognizer is installed in or around the car door lock or the building door lock, the problem can be solved by using them to unlock the lock.

A portable remote control key with the battery built in, or a key with keyless starting system with the battery built in, or a standalone electronic key, or other portable electric appliances with the function of the electronic key is sealed with one or more processing techniques of the rubber ring, the rubber gasket, an integral forming of plastic housing, a plastic welding, a bonding and a metal welding, so as to prevent water and gas from entering into the inside from the outside.

For a door lock or anti-theft system electronic lock of a vehicle, the owner himself can carry out an electronic key pairing, a passcode registration and a biometric characteristic registration. For passcode registration of a mechanical passcode door lock, it is needed to operate inside and outside the door after the vehicle's door is opened. For electronic key pairing, passcode registration and biometric characteristic registration, it is needed to use one or more of mechanical keys, magnetic card keys, IC keys, RFID tag keys, passcodes and biometric characteristics for pairing purpose, to carry out pairing and registration. When purchasing a new car or a used car, the car owner is provided with key and passcode for pairing use and registers fingerprints for pairing use. For example, the key for pairing use is a non-powered RFID card having the same size as a bank card. When purchasing a car, the new car owner makes a clear operation to disable all of the electronic key, the passcode and the biometric characteristic, and then re-match the key and re-register the passcode and the biometric characteristic. For convenience, the key for pairing use can also open the car door lock and the anti-theft system electronic lock. Only one rather than two or more keys for pairing use can be allowed, and when the key for pairing use or the passcode thereof is missing, the car owner must contact the car manufacturer or shop, and the car manufacturer or shop confirms the car owner's ID and then give one or more of a new key for pairing use, a passcode for pairing use and a registration of fingerprints for pairing use according to the car's ID number. Once the new key for pairing use, the new passcode for pairing use or the new fingerprints for pairing use are adopted, the used key for pairing use, the used passcode for pairing use or the used fingerprint for pairing use is disabled. The key for pairing use, or the passcode for pairing use or the fingerprint for pairing use is usually not used as the general key, or the general passcode or the general fingerprint. As a key for pairing use, an electronic key is preferred to a mechanical key. The combination of a non-powered contactless CPU tag key and an electronic key exhibits excellent anti-theft performance and is an ideal set of keys for pairing use and passcode for pairing use.

A non-powered electronic key and a powered electronic key for the car or the building, particularly a card key, has a low cost and is convenient to lend to others. At this time, the owner can set limited period of validity or times of validity of the card key, for example, 4 hours or 3 times. When the key is lent to others, the setting of limited period or limited times of validity is much safer than the setting of unlimited period or unlimited times of validity, and requires less concerns.

If the car electronic key is missing or stolen, a malicious person who gets the key may see the identity of the car manufacturer or the car type on the key and may find the car from a distant place easily, enter the car and drive the car away. Accordingly, as provided herein, there are no any identity of the manufacturer or the type of vehicles, buildings, building door locks, cabinets, cabinet door locks and standalone electronic locks on the surface of the portable non-powered or powered original authentic key from the car manufacturer. For a key that is not an original authentic key, it should have no identity of the original manufacturer. To facilitate the identification by the owner, some numerical codes and patterns are provided. However, since the key for pairing use is not common and unlikely to be missed, the identity of the manufacturer can be provided to facilitate the identification by the owner.

Figure 7:
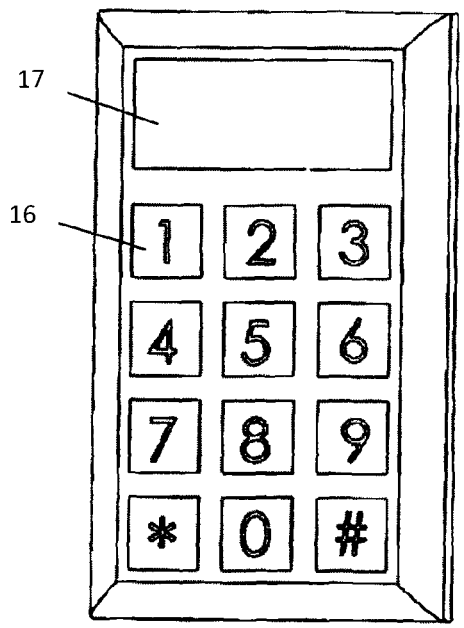
FIG. 7 shows a front side of a typical radio electronic passcode key.
Figure 8:
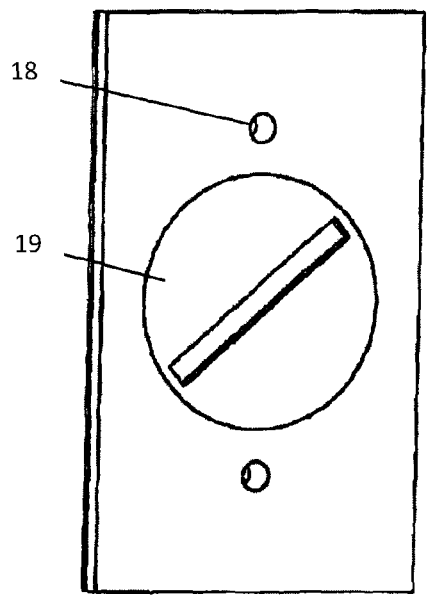
FIG. 8 shows a back side of an electronic passcode key.

FIG. 7 is a front view of the typical electronic passcode key input keyboard of the present disclosure, which has a numerical key 16 and a solar panel 17. FIG. 2 is a back view of the input keyboard of the electronic passcode key, which has two threaded holes 18 and a round cover 19 for battery replacement. The solar panel 17 and the round cover 19 may not be required at the same time, so either of them is removed. If the solar panel 17 and the built-in rechargeable battery thereof serve as a power supply, the service life may reach more than 10 years, and the round cover 19 is not needed. In the case that a disposable battery rather than the solar panel 17 is used, the service life of it may be less than 10 years, so that the battery needs to be replaced, and the round cover 19 is not needed.

Accordingly, the power supply for the electronic passcode key input keyboard may be the combination of a built-in disposable battery, a built-in solar power generation assembly and an external power supply.

Importantly, two threaded holes 18 are disposed on the back of the electronic passcode key input keyboard. These two threaded holes are used for mounting the electronic passcode key on the outer wall of a vehicle (such as a car) or a building. For example, two through holes are disposed on the outer wall of the car, and the electronic passcode key input keyboard is fixed by screws through the two holes from the inside of the car. When the electronic passcode key input keyboard is fixed or removed, the operation needs to be performed from the inside of the car. A person who is not provided with the car key fails to come into the car and thus cannot steal the electronic passcode key unless the electronic passcode key input keyboard is destroyed. Herein, car engine compartments and cargo compartments are also the inside of the car.

Figure 9:
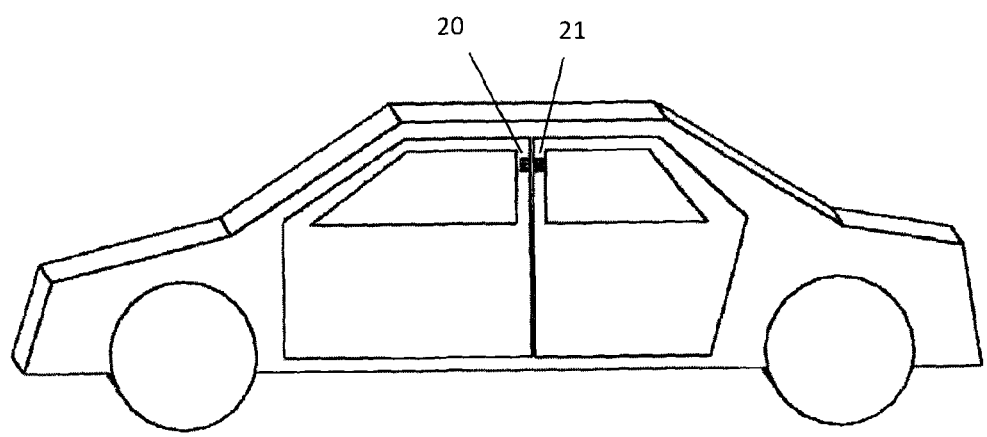
FIG. 9 shows that the electronic passcode key is fixed on a car door.

The electronic passcode key input keyboard is mounted in a suitable position on the car, for example, driver car door and periphery thereof. For example, as shown in FIG. 9, at the driver car door window glass frame 20, and at the car door window glass frame 21 of a driver rear seat, when opening the car door, a person can directly see the screws for fastening the electronic passcode key input keyboard on the car door frame from the inside of the car, which can be removed or installed conveniently from the inside of the car. For aesthetic purpose, a protective cover may be arranged at the fastening screws inside the car. The protective cover and the fastening screw are convenient for removal and installation, have simple configuration, can be seen directly by a person, and can be operated by an ordinary person instead of a skilled person, without the need to read the instructions. The electronic passcode key may also be fixed to an engine compartment door, a cargo compartment door or the like.

Figure 10:
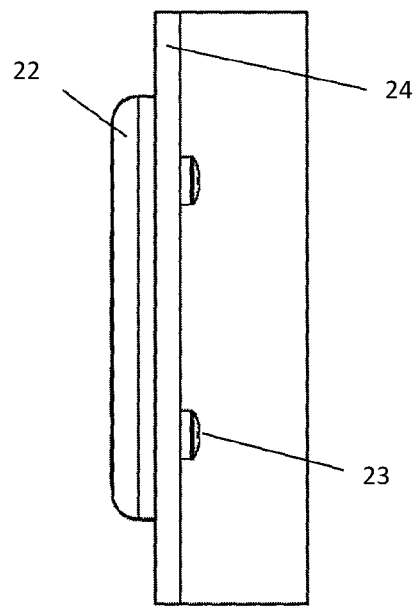
FIG. 10 shows a state in which the electronic passcode key is fixed to an installing hole of the car door through screws.
Figure 11:
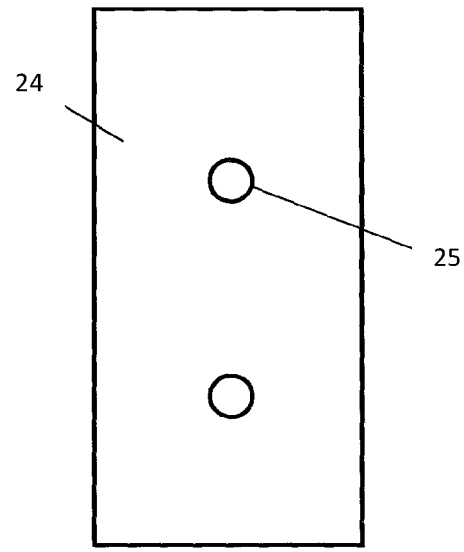
FIG. 11 shows the installing holes in the car door.

FIG. 10 shows a state in which the electronic passcode key input keyboard 22 is fixed by two screws 23 to the car door 24. The two screws 23 penetrate from the inside of the car through the installing hole 25 (as shown in FIG. 11) on the car door 24, fixing the electronic passcode key input keyboard 22. When the car door is opened, an ordinary person may easily install and remove the electronic passcode key input keyboard 22 with only a screwdriver, so the labor cost for replacing the electronic passcode key is substantially equal to zero. When the car door is closed, a person outside the car cannot loosen and remove the screws 23, so that the electronic passcode key input keyboard is prevented from being stolen.

In addition, a threaded rod may be screwed in advance into the threaded hole 18 in the back of the electronic passcode key input keyboard 22. During installation, the threaded rod on the electronic passcode key input keyboard 22 may penetrate from the outside of the car through the installing hole 25 on the car door 24, and then a nut is screwed from the inside of the car to fix the electronic passcode key input keyboard 22.

Figure 12:
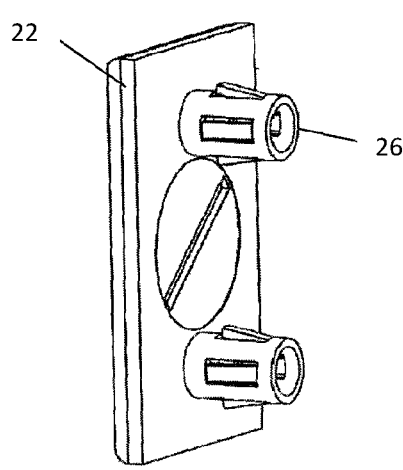
FIG. 12 shows a barbed rivet arranged on a back side of the electronic passcode key and simply fixed in the installing hole.
Figure 13:
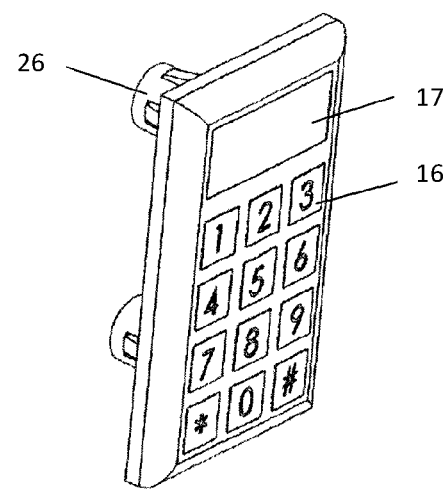
FIG. 13 shows a front oblique view of the electronic passcode key with the barbed rivet.

As shown in FIG. 12, a barbed rivet 26 may also be screwed in advance into the threaded hole 18 on the back of the electronic passcode key input keyboard 22. The barbed rivet 26 may simply be inserted from the outside of the car into the installing hole 25 on the car door 24 to fix the electronic passcode key input keyboard 22, without having to open the door. However, in order to remove the barbed rivet, one need to open the door to shrink the barbs, which may also prevent the electronic passcode key input keyboard from being stolen. FIG. 13 is a front oblique view of the electronic passcode key input keyboard with the barbed rivet.

The installing hole 25 may be round or long hole through which screws, nuts and barbed rivets may be used to firmly fix the electronic passcode key 22. The installing hole 25 may be preformed in car manufacturers in advance, or may also be fabricated after the electronic passcode key input keyboard 22 is given.

Since the electronic passcode key input keyboard is used outdoors, it need to have the waterproof function. The housing of the electronic passcode key input keyboard may be processed for waterproof sealing with one or more processing techniques of the integrated forming of plastic, plastic welding, metal welding, adhesive bonding, and rubber ring sealing. If there is a battery cover, a rubber ring may be set at the battery cover for the waterproof sealing. The housing of the electronic passcode key input keyboard cannot be opened, except at the point of the rubber ring sealing. The point of the rubber ring sealing may only be opened from the back of the housing of the electronic passcode key input keyboard by firstly removing the electronic passcode key input keyboard from the inside of the car. Others outside the car cannot open the housing from the front or the side thereof. If the keyboard uses solar panels and is equipped internally with a rechargeable battery, the battery may need not to be replaced for more than 10 years, so the battery cover may be omitted, and making waterproof simpler.

Figures 14, 15, 16:
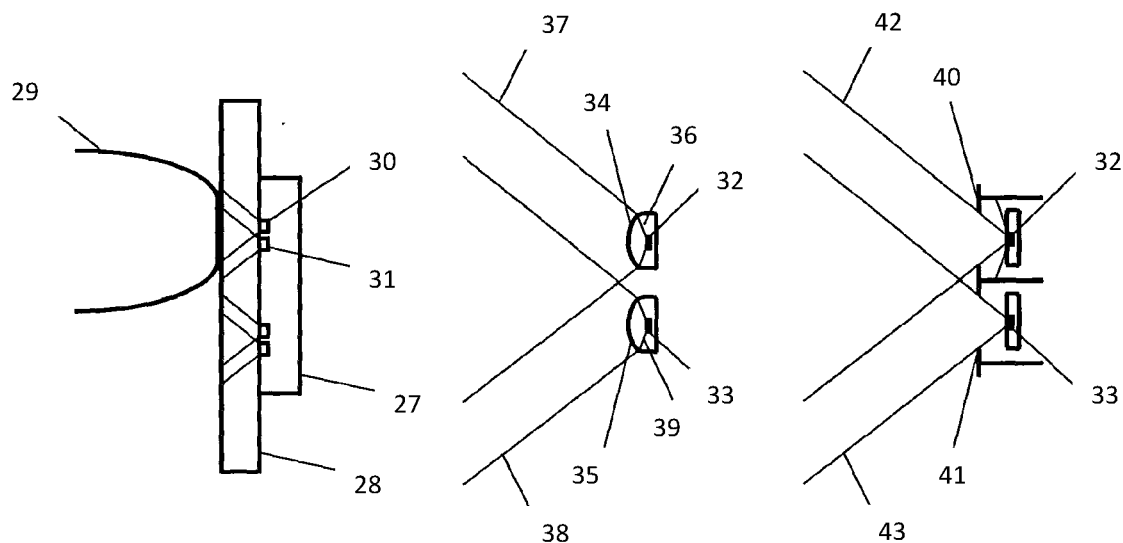
FIG. 14 shows the electronic passcode key formed by an optical keyboard and installed in a car window glass. A user adopts a pointing object to operate a keypad outside the window glass.
FIG. 15 shows a schematic diagram in which a lens is used for changing light rays of a large emission angle of emitted light into light rays of a medium emission angle, and changing light rays of a medium reflection angle of reflected light into light rays of a large reflection angle.
FIG. 16 shows a schematic diagram in which small holes near an emission surface block light rays of the large emission angle and only allow light rays of the medium and a small emission angle to pass through them; the small holes near receiving surface only allow light rays of the medium and small angles of the reflected light to enter a light receiver.

FIG. 14 is an electronic passcode key input keyboard with optical buttons proposed by the present disclosure. At this time, the electronic passcode key input keyboard 27 with optical buttons is fixed to the inner side of the car window glass 28 with adhesive or screws, and one may operate the buttons by touching the window glass 28 from the outside with a pointing object 29 such as a finger or a pen, etc. Since the optical keyboard is inside the vehicle, it will not be accidentally damaged because of snow and ice removal from the outside of the car in winter, making the waterproof performance unnecessary.

In the example of FIG. 14, there are a pair of light emitter 30 and light receiver 31 adjacent to each other in each button of the optical keyboard. The light emitter 30 may be a light emitting diode, and the light receiver 31 may be a photodiode or phototransistor. The diagonal bell mouth shape in the drawings is the light emitting angle range of the light emitter 30 and the light receiving angle range of the light receiver 31. When the pointing object 29 touches the position of buttons on the window glass 28 from the outside of the car, light emitted from the light emitter 30, after reflected by the pointing object 29, enters the light receiver 31. When the pointing object 29 does no touch the position of buttons, there is no reflection, so the light emitted from the light emitter 30 does not enter the light receiver 31.

Typically, the light emitting angle range of the light emitter is greater than the angle of the diagonal bell mouth shape in FIG. 14. In order to decrease the light emitting angle, in FIG. 15, a lens 34 is arranged in the vicinity of the light emitting surface 32 of the light emitter 30, and the lens 34 converges the light with a large emission angle 36 emitted from the light emitting surface 32 into light 37 with a medium emission angle. In FIG. 15, a lens 35 is also arranged in the vicinity of the light receiving surface 33 of the light receiver 31, and the lens 35 diverges the light 38 with a medium reflection angle reflected from the pointing object 29 into light 39 with a large reflection angle, which enters the light receiving surface 33 of the light receiver 31. The light with a large emission angle does not enter the light receiving surface 33. As such, both the light emission angle and the light receiving angle are reduced.

In FIG. 16, a hole 40 is arranged in the vicinity of the light emitting surface 32 of the light emitter 30, and the hole 40 blocks the light with a large emission angle, and allows only the light with a small/medium emission angle to get through. In FIG. 16, a hole 41 is also arranged in the vicinity of the light receiving surface 33 of the light receiver 31, and the hole 41 blocks the light with a large reflection angle, and allows only the light with a small/medium reflection angle to enter the light receiving surface 33. As such, both the light emission angle and the light receiving angle are reduced. Compared with the lens type of FIG. 15, the holes block energy of the light with a large angle, and with lower efficiency.

Chinese Patent CN 2482137 Y, Huang Mingzhi, 13 Mar. 2002, invented an optical button input device, wherein an optical hole is arranged at the central position of each button, so that light from a light emitting diode illuminates a finger through the optical hole, and the light reflected from the finger also enter a light receiver through the hole. Its configuration is different from that in FIG. 14 of the present disclosure. Chinese Patent CN 102479007 A, Lv Zhiguo, 30 May 2012, invented an optical keyboard, wherein differently from the present disclosure, there is no lens of FIG. 15 or holes of FIG. 16 in its optical transceiver module.

In order to reduce the influence of ambient light, the inside or outside of the window glass 28 may be provided with a bandpass filter layer of emitted light wavelength, allowing only the light reflected by the pointing object 29 and the ambient light with the same wavelength as the light emitted from the light emitter 30 to pass through the filter layer and enter the light receiver 31. Light with other wavelengths in the ambient light cannot pass through the bandpass filter layer and thus cannot enter the light receiver 31.

In addition, the light emitter 30 is driven by a high frequency pulse, and the frequency of its high frequency pulsed light is much higher than the approximately constant ones of the ambient light, so that the light receiver 31 may filter out the low-frequency ambient light after receiving the light.

Light emitted from the light emitter 30 in one button, after reflected by the pointing object 29 when the button is pressed, will substantially only enter the light receiver 31 of the same button. However, when the pointing object 29 is far from the window glass, a part of the reflected light enters the light receiver of an adjacent button. However, the maximum light intensity received by the light receiver 31 of the same button is much stronger than the light intensity received by the light receiver of the adjacent button. By comparison, one can determine the button instead of the adjacent button is pressed by the pointing object 29.

Sometimes, the electronic passcode key button requires a lot of power consumption in the operable state, so here the electronic passcode key is usually made in a standby mode with small power consumption and the buttons cannot work. When one needs to operate the buttons, he can pull the car door handle once outside or inside the car, and then the car sends a signal to the electronic passcode key, so that the buttons of the electronic passcode key are in the operable state, and the code operation must start within a set time, for example 30 seconds. With a set time after the code operation is completed, for example after 60 seconds, the buttons are back to the inoperable state. As such, the buttons are in operable state for a short time with small power consumption, so that the battery in the electronic passcode key may provide a long battery life.

For the code operations of the car electronic passcode key, a couple of grades can be set. For example, the first grade is to lock the car doors with a simple button. The second grade is to open the car doors, for example with a 4-8-digit passcode. The third grade is to start the engine, for example with another 6-digit passcode. After starting the engine, other passcode operations may be performed, such as to start air conditioner, to set temperature, etc.

After the passcode for opening the car doors is input, the passcode for starting the engine can be then input within a set time, for example 20 seconds to directly start the engine. Alternatively, a driver can input a passcode for temporarily relieving the anti-theft state of the engine electronic lock, then he may get in the car, sit on the driver's seat and press a button or twist a knob switch by hand within a set time, for example 120 seconds, to start the engine. It will be convenient if this button or knob switch is provided on the instrument panel that is also called dashboard around the steering wheel.

Another electronic passcode key input keyboard may be arranged on or around the instrument panel in a car or on a motorcycle, and a driver may input the passcode for starting the engine to directly start the engine. A driver can input a passcode for temporarily relieving the anti-theft state of the engine electronic lock, and then he may press a button or twist a knob switch by hand within a set time, for example 60 seconds, to start the engine. As such, hand-held keys may be completely eliminated.

The electronic passcode key input keyboard may be not installed on vehicles and buildings. Rather, one can hold it in his hand, and can perform the remote passcode operation from a distance. Even if someone else steals the electronic passcode key, he cannot operate, in favor of security.

The electronic key passcode input keyboard may also have and use the non-powered electronic key, the powered electronic key and the biometric characteristic unlocking functions. Particularly, the non-powered magnetic card, the non-powered contact type IC card, the non-powered contactless card-shaped RFID tag, and the non-powered contactless key-card-shaped RFID tag, with small size, light weight, and low cost, may be lent to others conveniently.

For the set time, the manufacturer may give a factory setting, and users may change the setting according to their own situation.

In order to reduce costs, the electronic passcode key input keyboard will not be made to be dedicated to a brand but made to be common. For example, the electronic passcode key input keyboard for cars may be common to a number of car brands. The electronic passcode key input keyboard for cars may also be common to motorcycles and buildings. Further, through passcode operations, one electronic passcode key input keyboard may be used to open electronic locks of several cars and buildings. The above electronic locks include door locks, an engine anti-theft electronic lock system, etc.

The common electronic passcode key input keyboard may be easily purchased from a store, and can be set by the owner for pairing and passcode setting with electronic lock assemblies, such as the car door lock, the engine anti-theft system, the air-conditioning control system, etc. To this end, the owner can use an owner mechanical key or an owner electronic chip to operate. For example, when getting close to the steering wheel, the owner electronic chip communicates with the car via radio, making it possible for match setting and passcode setting. When the owner electronic chip is far away from the steering wheel, radio communication is interrupted, making it impossible for match setting and passcode setting. A brief description for setting may be attached to the inner surface of the door to facilitate the operation of the owner. The existing car anti-theft remote control key may also be used as an owner electronic chip.

During car selling, the owner mechanical key or the owner electronic chip should be handed over to the new owner. The car franchised stores can restore or make one and more than one of the owner mechanical key and the owner electronic chip after identifying safety of the owner identity. There can be several owner electronic chips or only one owner electronic chip. When only one owner electronic chip is permitted, the old owner electronic chip will be invalid when the new owner electronic chip is available. Generally, the owner mechanical key and the owner electronic chip are not lent to other people, and the owner should not tell the passcode to others, so even other people open the car door, they cannot match or change the key passcode of the car. The key and the passcode used for pairing are also called the owner key and the owner passcode.

The passcode can be a number with 1 to 32 digits, with * and # respectively added in front of and behind of the number. A set of examples are as follows:

*123451#: unlock electronic door lock with the passcode

*1234567890123456#: unlock electronic door lock with the second passcode

*123402#: unlock door lock with temporary passcode, and temporary passcode can only be used twice

*1#: lock door lock with passcode

*223451#: unlock vehicle anti-theft system electronic lock with passcode

*2234567890123456#: unlock vehicle anti-theft system electronic lock with the second passcode

*223403#: unlock vehicle anti-theft system electronic lock with temporary passcode, and temporary passcode can only be used twice

*2#: lock vehicle anti-theft system electronic lock with passcode

*323453#: start engine with passcode

*3#: stop engine with passcode

*42400020#: start air conditioner with passcode, and temperature is set at 20 deg. C. or the set temperature of air conditioner is changed to be 20 deg. C. during the operation of the air conditioner

*4#: stop air conditioner with passcode

: simultaneously stop air conditioner and engine, and also lock electronic door lock and vehicle anti-theft system electronic lock

*92345678901234567890123 4#: input owner passcode

*99345678901234567890123 4#: set new owner passcode after inputting old owner passcode or using owner electronic chip

*9123451#: set new door unlocking passcode after inputting owner passcode or using owner electronic chip

*999#: pair new electronic key after inputting owner passcode or using owner electronic chip

***: interrupt passcode operation. Passcode operation can be restarted immediately.

To prevent other people from identifying the passcode input by the owner, the owner can input false numbers and true numbers together, and the passcode control unit can automatically eliminate the false numbers and receive the true numbers. For example, *1234*123451# is equivalent to *123451#, and all the numbers *1234 in front of the last * are false numbers. *123451#123# is equivalent to *123451#, and all the numbers 123# after the first # are false numbers. *1234*123451#123 is equivalent to *123451#. *1234*123451#123### is equivalent to *123451#, and the last ### requires the passcode control unit to eliminate the false numbers and receive the true numbers. The false number can be any number of any digit.

Figures 17, 18:
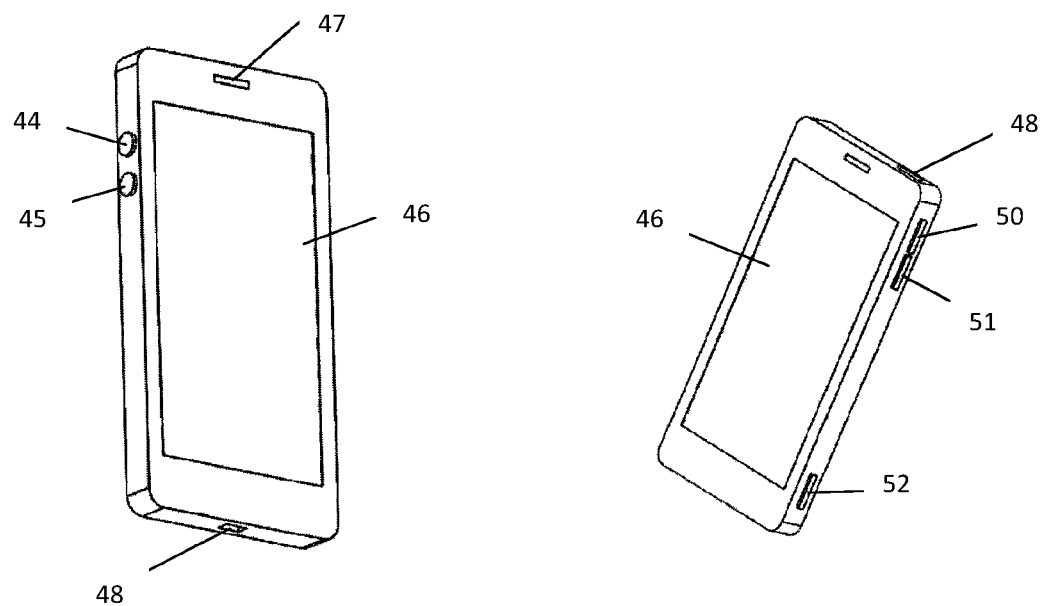
FIG. 17 shows an oblique view of one direction of a smartphone which can unlock and lock an electronic lock.
FIG. 18 shows an oblique view of another direction of the smartphone which can unlock and lock the electronic lock.
Figure 19:
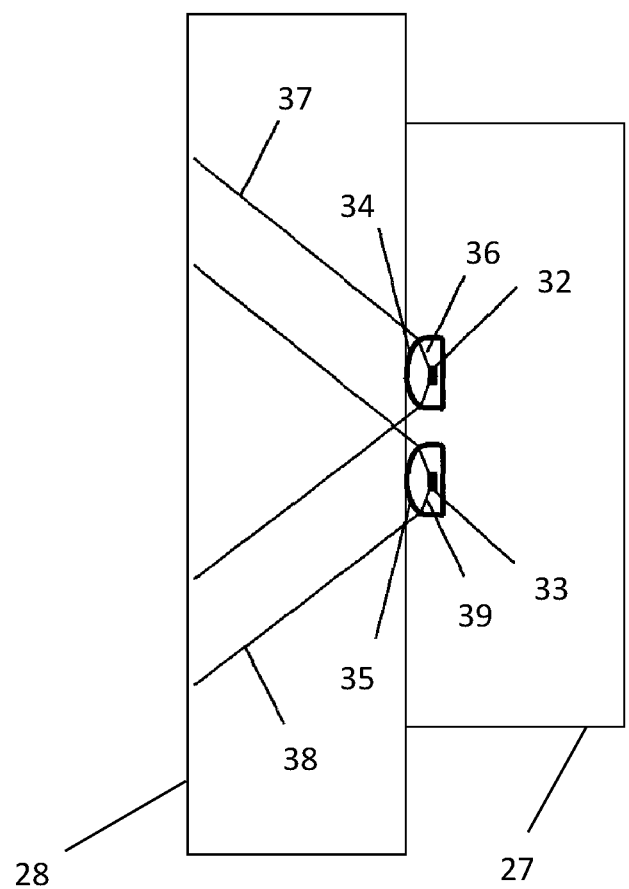
FIG. 19 shows a schematic diagram illustrating both the lens and the filter integrated within a single embodiment.

FIG. 17 is an oblique view of one direction of a smartphone which can unlock and lock an electronic lock. 44 is the unlocking button, 45 is the locking button, 46 is the touch display screen, 47 is the mobile phone receiver, and 48 is the charging socket of the mobile phone. FIG. 18 is an oblique view of another direction of the smartphone. 49 is the power supply button of the mobile phone, 50 and 51 are volume buttons, and 52 is the photographing button. The portable electric appliance can be a mobile phone, a smartphone, a tablet computer, a computer, a smart watch, a digital camera or a digital multimedia player. Correspondingly, electronic locks are installed on doors of cars, trains, motorcycles, ships, airplanes and other vehicles, the engine anti-theft systems of the vehicles, air conditioners of the vehicles, vehicle recorders, garage doors, building doors, safe boxes, safe cabinets, etc. The portable electric appliance of the present disclosure first pairs with the electronic lock, and sets unlocking and locking passcode or without passcode, or registers fingerprint, face, iris, vein and other biometric characteristic. If the portable electric appliance sets passcode or biometric characteristic, the electronic lock of the electric appliance cannot be unlocked by others with no passcode or correct biometric characteristic even if the portable electric appliance is lost or stolen, which is favorable for safety.

As the key, the smartphone has a strong function and is convenient to control remotely, but the power consumption is fast, and the mobile phone cannot work without electricity. For car locks or building door locks unlocked by mobile phones, one or more of electronic key recognizers, electronic passcode key input keyboards or biometric characteristic recognizers can be installed on cars or buildings, and unlocking with the recognizers or input keyboards solves the problem when the mobile phone keys cannot work.

The electronic lock of the portable electric appliance is locked and unlocked through wireless communication, that is the portable electric appliance has a remote control key function. The general coding modes of the remote control key include two types: fixed codes and rolling codes. The fixed codes in wireless communication can be easily overheard and recorded by the interceptors and then are used for unlocking by emitting the fixed codes later, so the fixed codes have poor confidentiality. The rolling codes are upgraded products of the fixed codes. As the unlocking code emitted each time is different from other codes, the interceptor cannot unlock the lock with the previous unlocking code even if it obtains the previous unlocking code, so the rolling codes have good confidentiality. Currently, all occasions with confidentiality requirements use the coding mode of rolling codes. All the above-mentioned electronic locks require high confidentiality and vehicle anti-theft performance, so the coding mode of rolling codes is needed.

For today's smartphones, most of them usually have a cellphone communication mode, a Bluetooth communication mode, and a WIFI communication mode. Although they are powerful in wireless call and wireless communication, they still employ a fixed code mode when being put through. For example, a cellphone can make wireless call with other's cellphone just by inputting the phone number. A cellphone can make the wireless communication with other's WIFI just by inputting the passcode. Because the phone number and the WIFI passcode do not change after the cellphones' being put through, they are fixed codes. For its poor confidentiality, the fixed code is not suitable for the car door lock and the anti-theft system electronic lock of the automotive engines. That's why today's car remote control keys don't employ the cellphone communication mode, the Bluetooth communication mode, and the WIFI communication mode. A car remote control key generally employs carrier frequencies of 315 MHz, 433 MHz, or 818 MHz, and typically use an encoded mode of a rolling code. There is also a cellphone communication using frequency of 800 MHz, but the signal is different from the signal of the car remote control key, and typically cannot unlock and lock the car.

Based on the prior cellphone communications mode, the Bluetooth communication mode, and the WIFI communication mode, the present disclosure adds a rolling code function so as to facilitate the cellphone to unlock and lock the electronic lock with high confidentiality. For example, with cellphone communications mode, after the cellphone keypad operation issues the command of unlocking, the cellphone first automatically enters the phone number of the car electronic lock, then the cellphone automatically issues the rolling code to unlock the electronic lock after being put through. After the cellphone keypad operation issues the command of locking, the cellphone first automatically enters the phone number of the car electronic lock, and then the cellphone automatically issues a rolling code to lock the electronic lock after being put through. When a cellphone uses the Bluetooth communication mode or the WIFI communication mode, it connects the Bluetooth communication mode or the WIFI communication mode when approaching the car electronic lock, and then it automatically issues the rolling code to unlock the electronic lock. The electronic lock is locked after the cellphone is more than 5 meters away from the car for over 10 seconds. The Bluetooth communication is cut off when the cellphone is more than 10 meters away from the car, or the WIFI communication is cut off when the cellphone is more than 30 meters away from the car. The rolling code every time the cellphone issues is different, so the confidentiality is good.

The electronic devices of radio frequency communications of remote control keys of the cars and garage doors, anti-theft chips of remote control keys, and electronic devices of infrared ray communications can be built in the cellphone. The cellphone employs the encoded mode of the rolling code to unlock and lock the above-mentioned electronic locks. These electronic devices are small in volume and light in weight, and thus they will not greatly increase cellphone costs and size. It's easy to install a key software program in a cellphone, and to achieve multifunctional control.

In order to expand the use of cellphones, they can also serve as remote controllers for video machines of television sets and audio systems, air conditioners of buildings, and power switch controllers. Amongst them, sockets of power switch controllers can be plugged into typical electric appliance power cord plugs such that the controllers can switch on and off typical electric appliances, such as televisions, audio systems, sound recorders, video recorders, electric taps, and so on. These machines usually don't require being confidential, and cellphones, as remote controllers, preferably employ an encoded mode of fixed code to make wireless communications with these machines.

If a cellphone is installed with a key software program, the program software can perform various settings to drive an electronic lock. Before driving the electronic lock, the key program in the cellphone is started to pair with electronic lock. The mode that the cellphone makes wireless communications with the electronic lock is selected in the cellphone, such as the carrier frequency of the remote control key, the Bluetooth communication mode, the WIFI communication mode, the cellphone communication mode, or the infrared light communication mode, and the encoded mode of the fixed code or the rolling code is also selected. The radio frequency communication, the Bluetooth communication mode, and the WIFI communication mode of the remote control key of the car and the garage door are near field communications, and the infrared ray communication typically is also a near field communication. The cellphone communication has a ground-based cellphone communication and a satellite cellphone communication. The ground-based cellphone communication mode is a wireless communication network that covers the most regions where people usually stay around the world. The satellite cellphone communication is a wireless communication that uses satellites as transfer stations, and can cover cities, villages, mountainous areas, deserts, seas and other vast areas around the world. The choice of cellphones must be consistent with the specifications of electronic locks. When an electronic lock leaves the factory, the manufacturer will give it a factory secret key. When a cellphone makes pairing connections with the electronic lock, the cellphone needs to enter the factory secret key of the electronic lock, and successful pairing connections are confirmed. The cellphone can remove the pairing connections with the electronic lock by keypad operations. Moreover, the electronic lock can also be provided with a pairing button. Once this pairing button is pressed, the electronic lock will emit a pairing secret key, and within a time, for example within 10 seconds, connection is performed after the press of the pairing button in a cellphone to accept the pairing secret key. If the pairing button of the electronic lock is pressed continuously for over 5 seconds and then released, all previous pairing connections of cellphones and other portable electric appliances are removed. Pairing buttons can also be pairing knobs or pairing shift switches here.

In regard to the generation of rolling codes, the electronic lock is configured with a manufacturer factory secret key, and when a car owner pairs the car electronic lock with mobile phone key software, an equation is given or selected, and the rolling code of each time is calculated by the equation and the factory secret key. The factory secret key and the equation are memorized in the mobile phone and the electronic lock during pairing. After each time of communication for unlocking or locking, both the mobile phone and the electronic lock calculates the same rolling code of the next time, the mobile phone transmits the rolling code of the next time to the electronic lock, and unlocking or locking is executed when the rolling code of the next time is consistent to the rolling code of the next time calculated by the electronic lock. The unlocking or locking is not executed when the inconsistent situation exists. Only different rolling codes are transmitted between the mobile phone and the electronic lock each time, and the factory secret key and the equation are not transmitted. In particular, the owner inputs his favorite equation by using the mobile phone key software or randomly selects one equation from the mobile phone key software, but does not know the contents of the equation. As to the equation, the manufacturer also knows nothing about it. Even though other people intercept and capture an existing rolling code by using an interceptor and know the factory secret key, the rolling codes for later unlocking cannot be calculated since they do not know the equation.

After pairing connection succeeds, set a passcode or passcode free for unlocking or locking the electronic lock.

For improving the confidentiality and preventing other people from freely performing pairing with their portable electric appliance or relieving existing pairing, a pairing mechanical lock, a pairing electronic lock or a pairing passcode is further installed on the electronic lock. When the portable electric appliance and the electronic lock perform pairing, one or more of owner mechanical key, owner electronic chip, owner electronic card and owner passcode are firstly needed for unlocking the pairing lock. For example, when the owner electronic chip is taken nearby a steering wheel of the car, the owner electronic chip and the car electronic lock perform radio communication to unlock the pairing lock so as to make the electronic lock in pairing enable state. In this state, the portable electric appliance pairs with the electronic lock and set the passcode for unlocking or locking the electronic lock or set passcode free unlocking. When the owner electronic chip is taken away from the steering wheel, the radio communication is interrupted, the pairing becomes disable, and pairing setting and passcode setting cannot be performed.

When a vehicle or a building is sold, owner mechanical key, owner electronic chip, owner electronic card and owner passcode should be given to the new owner. A franchised car or building shop can also restore or make one or more of owner mechanical key, owner electronic chip, owner electronic card and owner passcode after confirm the ownership. Owner electronic chips can be only one or more. When only one owner electronic chip is allowed, as soon as the new owner electronic chip is effective, the previous one becomes disable. The owner mechanical key, owner electronic chip, owner electronic card and owner passcode are generally only reserved and used by the owner rather than others. Even if other people unlock the car, they cannot pair with their portable electric appliance, cannot relieve pairing, and cannot change passcode without using above owner things.

For improving the universality of portable electric appliance, one portable electric appliance can pair with multiple electronic locks. For instance, one smartphone can pair with the electronic locks of doors and engines of several cars, several garage doors and several room doors. The multiple functions of the portable electric appliance are easily achieved by using key software based on necessary electronic device hardware. The communication modes of the electronic locks can be different and can be any one of remote control key radio frequency communication, infrared ray communication, Bluetooth communication, WIFI communication and mobile phone communication modes, the user can use the key software of the portable electric appliance to select the proper communication mode to pair with the electronic locks.

When one smartphone is paired with multiple electronic locks, the smartphone gives a number and description to each electronic lock, and set unlocking passcode, locking passcode or passcode free unlocking. For managing the electronic lock number, description, passcode, rolling code equation, the key software can give a list in large screen display, output to or input from computer. The computer can easily do the management, modification and calculation.

For utilizing the existing technologies of the cars and other remote control keys, a mechanical panic button or software type panic button is arranged on the portable electric appliance. When it is found that a suspicious person tries to enter the car or the building, the panic button is pressed, and the car or the building gives an alarm. In addition, the portable electric appliance can further comprise one or more of an existing technically-mature electronic device adopting remote control key radio frequency communication, a remote control key anti-theft chip and a remote control key pairing, setting and operating software to well achieve remote control function.

With respect to the electronic lock operating mode of the portable electric appliance, key operation wireless communication mode and approaching wireless communication mode are provided. Generally, key operation refers to key pressing operation, key shifting operation and knob turning operation. In the key operation wireless communication mode, the electronic lock is unlocked or locked by simply pressing mechanical or software buttons. For different electronic locks and passcode operations, one starts the key software, selects the electronic lock number and input the passcode to perform unlocking or locking.

In approaching wireless communication mode, bring the portable electric appliance close to the electronic lock within a certain distance, for example, within 5 meters. The portable electric appliance automatically performs communication with the electronic lock for unlocking. After the portable electric appliance is taken away from the electronic lock for a set time, for example, after 10 seconds, the electronic lock is automatically locked. For different electronic locks, the portable electric appliance automatically identifies the electronic lock numbers for unlocking.

For a building, a garage, a safe cabinet and a safe box, an electronic lock is a door lock, a case cover lock, a motor starting switch lock and an air conditioner starting switch lock and the like. For the vehicles, the electronic lock is a door lock, an vehicle anti-theft system lock, an engine starting switch lock, an air conditioner starting switch lock and the like.

For the vehicle electronic lock, the portable electric appliance performs one or more of the following key operations: (1) unlock or lock door lock with passcode or without passcode; (2) after unlock door lock, with passcode or without passcode, unlock engine anti-theft electronic system lock and directly start the engine; (3) after unlock door lock, with passcode or without passcode, unlock engine anti-theft electronic system lock, then within a set time, start the engine by pushing button, turning knob or shifting a switch with hand; (4) without unlocking door lock, with passcode or without passcode, unlock engine anti-theft electronic system lock and directly start the engine; (5) after start the engine, with passcode or without passcode, directly start air conditioner; (6) before or after start the air conditioner, set air conditioning temperature.

In approaching operation of the portable electric appliance, do one or more operation as follows: (1) when carrying portable electronic appliance close to an electrical door lock of vehicle or the building, the door lock gets unlocked automatically; (2) when carrying the portable electronic appliance close to a vehicle driving seat, engine anti-theft electronic system lock gets unlocked automatically, then start the engine by pushing button, turning knob or shifting a switch with hand.

For different electronic locks, the key operation and the approaching operation may be performed together, and the key software easily performs setting. For example, a person operates smartphone keys to unlock the car door lock, enters into the car with the phone, and sits on the driver's seat so that the phone and the car are in approaching communication, and the engine electronic lock gets unlocked; and the person presses a button, twists a knob or shifts a switch with hand to start the engine. By setting key software, key operation and approaching operation can be selected or performed simultaneously. For an electronic lock, when the key operation and the approaching operation are performed simultaneously, the key operation is prior to the approaching operation.

The portable electric appliance such as a smartphone can easily transmit signal and receive data. In order to master the state data of the electronic lock, an inquiring signal is transmitted to several electronic locks through key operation, and each electronic lock feeds back the current state and the history data, e.g. unlocking and locking state of the door lock, engine running state, air conditioner starting state, air conditioner setting temperature, measured environment temperature, position information, recorder data and history data thereof and the like, of the electronic lock to the portable electric appliance after receiving the inquiring signal. If the car is stolen, since the mobile phone communication network covers most of the regions around the world where people often are and other regions like cities, villages, deserts and seas around the world, a smartphone can obtain the position information of the car through the mobile phone communication network at any time, which helps to find the car. In addition, a smartphone can also obtain various running record data and history of the car through near field communication such as Bluetooth communication mode to facilitate maintenance, malfunction analysis and accident analysis of the car.

For ease of unlocking and locking, the portable electric appliance comprises unlocking and locking mechanical buttons that may be special buttons and also may play a role in other occasions. In the occasion of a touch screen phone, a software touch button works only when the mobile phone is started. The mechanical button can work in both starting and sleep states of the mobile phone, and thus is useful.

When the portable electric appliance is used as a key, after inputting the passcode or recognizing the biometric characteristics, within a set time such as 5 minutes, the mechanical unlocking button may be used for unlocking operation whether the portable electric appliance is in the starting state or the sleep state. In this way, both convenience within the set time and security outside the set time are obtained.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A key and lock set for a vehicle, the key and lock set comprising:
   an electronic lock set configured as both a vehicle door lock and a vehicle engine start lock;
   a near access electronic key, comprising at least one of a contactless RFID card, a contactless RFID key tag, a contact type IC card, a contact type magnetic card, a passcode, and a biometric for lock;
   a near access electronic key identifier comprising at least one of an electronic key reader, an input keypad, and an identifier that is mounted in the vehicle with one accessible from outside of the vehicle for the vehicle door lock and another accessible from inside of the vehicle for the vehicle engine start lock;
   a far access electronic key, comprising at least one of a standalone key, and a portable electronic appliance, wherein the portable electronic appliance comprises at least one of a cell phone, a smart phone, a tablet, a computer, a smart watch, a digital camera, and a digital multimedia player;
   a far access electronic key identifier mounted in the vehicle, which is accessible from outside of the vehicle for the vehicle door lock and is accessible from inside of the vehicle for the vehicle engine start lock;
   wherein:
   both the vehicle door lock and the vehicle engine start lock are configured to be unlocked by the near access electronic key upon an identified match by at least one of the near access electronic key identifier of the electronic key reader, the input keypad, and the identifier;
   the identified match between the near access electronic key and the near access electronic key identifier is configured to have at least one of a valid time period, an unlimited time period, a limited number of usages, and unlimited usage;
   the identified match configuration of the near access electronic key identifier accessible from outside of the vehicle for the vehicle door lock is the same or different from that accessible from inside of the vehicle for the vehicle engine start lock;
   both the vehicle door lock and the vehicle engine start lock are configured to be unlocked by the far access electronic key upon a match identification by approaching operation with a rolling code wireless identification method with the far access electronic key identifier; and
   the near access electronic key and the far access electronic key are configured to unlock both the vehicle door lock and the vehicle engine start lock independently.

2. The key and lock set of claim 1, further comprising an electronic passcode input keypad that is mounted in the vehicle and accessible from outside of the vehicle, wherein:
   the vehicle door lock is configured to be unlocked by the lock passcode upon the passcode match with the keypad, regardless of whether the near access or/and far access electronic key unlocks the vehicle door lock or the vehicle engine start lock; and
   both the vehicle door lock and the vehicle engine start lock are configured to be unlocked by the near access electronic key or/and the far access electronic key upon the identified match by the electronic key identifier, regardless of whether the passcode for lock is configured to unlock the vehicle door lock.

3. The key and lock set of claim 1, further comprising an electronic passcode input keypad that is mounted in the vehicle and accessible from inside of the vehicle, wherein:
   the vehicle engine start lock is configured to be unlocked by the lock passcode upon the passcode match with the keypad, regardless of whether the near access electronic key or/and the far access electronic key unlocks the vehicle door lock or the vehicle engine start lock; and
   both the vehicle door lock and the vehicle engine start lock are configured to be unlocked by the near access electronic key or/and the far access electronic key upon the identified match with the electronic key identifier, regardless of whether the passcode for lock is configured to unlock the vehicle engine start lock.

4. The key and lock set of claim 1, wherein:
   the key and lock set is configured for a door;
   the key and lock set further comprises a keyboard mounted outside the door and configured to access the lock by accessing from outside the door;
   the keyboard is not removable from outside the door; and
   the keyboard is removable from inside the door through a mounting fastener or a cover.

5. The key and lock set of claim 4, wherein:
   the door is a door of the vehicle; and
   the keyboard is mounted on the vehicle.

6. The key and lock set of claim 5, wherein the keyboard is mounted outside the vehicle at an area other than the door.

7. The key and lock set of claim 5, wherein the keyboard is mounted outside the vehicle at an area on the door.

8. The key and lock set of claim 1, wherein the vehicle door lock comprises a rotary mechanical passcode dialer lock or a push-button mechanical passcode keypad lock that is accessible from outside of the vehicle to unlock the vehicle door.

9. The key and lock set of claim 1, wherein the near access electronic key identifier or far access electronic key identifier for the vehicle door lock is powered by an internal battery of the vehicle, an external removable battery, or a connector for an external power supply.

* * * * *